US010567494B2

(12) United States Patent
Huang et al.

(10) Patent No.: US 10,567,494 B2
(45) Date of Patent: Feb. 18, 2020

(54) DATA PROCESSING SYSTEM, COMPUTING NODE, AND DATA PROCESSING METHOD

(71) Applicant: HUAWEI TECHNOLOGIES CO., LTD., Shenzhen, Guangdong (CN)

(72) Inventors: Guowei Huang, Shenzhen (CN); Youliang Yan, Shenzhen (CN); Wangbin Zhu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 217 days.

(21) Appl. No.: 15/667,634

(22) Filed: Aug. 3, 2017

(65) Prior Publication Data
US 2017/0331886 A1 Nov. 16, 2017

Related U.S. Application Data

(63) Continuation of application No. PCT/CN2015/072451, filed on Feb. 6, 2015.

(51) Int. Cl.
G06F 17/30 (2006.01)
H04L 29/08 (2006.01)
(Continued)

(52) U.S. Cl.
CPC .......... *H04L 67/1023* (2013.01); *G06F 9/505* (2013.01); *G06F 16/1844* (2019.01);
(Continued)

(58) Field of Classification Search
USPC ......................................... 709/226, 201–204
See application file for complete search history.

(56) References Cited

U.S. PATENT DOCUMENTS 6,282,583 B1* 8/2001 Pincus .............. G06F 15/17337
712/13
2003/0236822 A1* 12/2003 Graupner .............. G06F 9/5066
709/203
(Continued)

FOREIGN PATENT DOCUMENTS

CN 102831102 A 12/2012
CN 103136244 A 6/2013
(Continued)

OTHER PUBLICATIONS

Wei Jiang et al: "Ex-MATE:Data Intensive Computing with Large Reduction Objects and its Application to Graph Mining", 2011 11th IEEE/ACM International Symposium on Cluster, Cloud and Grid Computing (CCGRID), May 23, 2011, XP032004381,10 pages.
(Continued)

*Primary Examiner* — Jude Jean Gilles
(74) *Attorney, Agent, or Firm* — Womble Bond Dickinson (US) LLP

(57) ABSTRACT

A data processing system, a computing node, and a data processing method are provided. The data processing system includes a management node and a first class of computing nodes. The management node is configured to allocate first processing tasks to the first class of computing nodes. At least two computing nodes in the first class of computing nodes concurrently perform the first processing tasks allocated by the management node. A computing node performs a combine2 operation and a reduce2 operation on a data block $M_x$ and a data block $V_{1x}$, to obtain a first intermediate result. Then, the management node obtains a processing result for a to-be-processed dataset according to first intermediate results obtained by the first class of computing nodes. According to the data processing system, when a combine operation and a reduce operation are being per-
(Continued)

formed on data blocks, memory space occupied by computation can be reduced.

24 Claims, 12 Drawing Sheets

(51) Int. Cl.
*G06F 16/182* (2019.01)
*G06F 9/50* (2006.01)
*G06F 15/16* (2006.01)
*H04L 12/911* (2013.01)

(52) U.S. Cl.
CPC ........ *H04L 67/1012* (2013.01); *G06F 9/5083* (2013.01); *H04L 47/823* (2013.01); *H04L 67/1078* (2013.01)

(56) References Cited

U.S. PATENT DOCUMENTS

| | | | | |
|---|---|---|---|---|
| 2008/0147821 | A1* | 6/2008 | Dietrich | H04L 63/104 709/216 |
| 2009/0094310 | A1 | 4/2009 | Watanabe et al. | |
| 2009/0153897 | A1* | 6/2009 | Blackmore | G06F 9/5016 358/1.15 |
| 2009/0157996 | A1* | 6/2009 | Arimilli | G06F 12/0284 711/170 |
| 2012/0078991 | A1 | 3/2012 | Nakanishi | |
| 2012/0131309 | A1* | 5/2012 | Johnson | G06F 9/30 712/41 |
| 2013/0251011 | A1* | 9/2013 | Ventola | H04L 1/1845 375/222 |
| 2014/0201450 | A1 | 7/2014 | Haugen et al. | |
| 2014/0331014 | A1* | 11/2014 | Liao | G06F 15/17306 711/147 |
| 2015/0095747 | A1* | 4/2015 | Tamo | H03M 13/151 714/781 |
| 2015/0264122 | A1* | 9/2015 | Shau | H04L 67/10 709/203 |
| 2017/0308789 | A1* | 10/2017 | Langford | G06N 3/0454 |

FOREIGN PATENT DOCUMENTS

| | | |
|---|---|---|
| CN | 103345514 A | 10/2013 |
| CN | 103544328 A | 1/2014 |
| JP | H05181895 A | 7/1993 |
| JP | H05324700 A | 12/1993 |
| JP | H06175986 A | 6/1994 |
| JP | 2009087282 A | 4/2009 |

OTHER PUBLICATIONS

Wei Jiang et al: "MATE-CG:A Map Reduce-Like Framework for Accelerating Data-Intensive Computations on Heterogeneous Clusters", 2012 IEEE 26th International Parallel and Distributed Processing Symposium, May 2012, XP055463734, 12 pages.

Kang U:"Mining Tera-Scale Graphs: Theory, Engineering and Discoveries", PhD thesis, Carnegie Mellon University, Pro Quest document id 1034734242, May 2012, XP055463738, 181 pages.

Shirahata K et al: "A Scalable Implementation of a MapReduce-based Graph Processing Algorithm for Large-Scale Heterogeneous Supercomputers", 2013 13th IEEE/ACM International Symposium on Cluster, Cloud and Grid Computing (CCGRID), May 13, 2013, XP032431211 ,8 pages.

Myung J et al: "Exploiting inter-operation parallelism for matrix chain multiplication using MapReduce", Journal of Supercomputing.,vol. 66, No. 1, Apr. 20, 2013, XP055463703, 16 pages.

Ghoting A et al: "SystemML: Declarative machine learning on MapReduce", Data Engineering (ICDE), 2011 27th International Conference on, IEEE, Apr. 11, 2011, XP031868524, 12 pages.

Narayanan Sundaram et al. GraphMat: High performance graph analytics made productive, PVLDB, Mar. 25, 2015. total 12 pages.

Jeremy Kepner et al. Graphs, Matrices, and the GraphBLAS:Seven Good Reasons, Procedia Computer Science, vol. 51, 2015, pp. 2453-2462.

Reynold S. Xin et al. GraphX: Unifying Data-Parallel and Graph-Parallel Analytics, arXiv:1402.2394v1 [cs.DB], Feb. 11, 2014. total 13 pages.

Zhengping Qian et al. MadLINQ: Large-Scale Distributed Matrix Computation for the Cloud, EuroSys'12, Apr. 10-13, 2012. total 14 pages.

U Kang et al. Pegasus: A Peta-Scale Graph Mining System—Implementation and Observations, ICDM 2009. total 10 pages.

U Kang et al. Pegasus: Mining Peta-scale graphs, Knowl Inf Syst Jun. 8, 2010. pp. 303-325.

Shivaram Venkataraman et al. Presto: Distributed Machine Learning and Graph Processing with Sparse Matrices, Eurosys'13 Apr. 15-17, 2013. pp. 197-210.

Matei Zaharia et al. Spark: Cluster Computing withWorking Sets, University of California. 2010. total 7 pages.

Mattson, Tim, et al. "Standards for graph algorithm primitives." High Performance Extreme Computing Conference (HPEC) Sep. 2013. total 3 pages.

* cited by examiner

900

```
┌─────────────────────────────────────────────────────────────┐
│ A management node allocates first processing tasks to at least two │
│ computing nodes that include an $FC_x$ and that are in a first class of │
│ computing nodes, where the $FC_x$ is the $x^{th}$ computing node in the │
│ at least two computing nodes, and x is a positive integer; and the at │ ~ S901
│ least two computing nodes in the first class of computing nodes │
│ concurrently process the first processing tasks allocated by the │
│ management node. │
└─────────────────────────────────────────────────────────────┘
```

The computing node $FC_x$ obtains, according to a first processing task allocated by the management node, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2. ~ S902

The computing node $FC_x$ performs a combine combine2 operation and a reduce reduce2 operation on the data block $M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i = v'_{i,n}$, $v'_{i,n}$ is obtained according to $v'_{i,j} = reduce2(v'_{i,j-1}, combine2(m_{i,j}, v_j))$, $m_{i,j}$ is an element in the data block $M_x$, $v_j$ is an element in the data block $V_{1x}$, j is a variant, and a value of j ranges from 1 to n. ~ S903

The management node obtains a processing result for the to-be-processed dataset according to first intermediate results obtained by the at least two computing nodes in the first class of computing nodes. ~ S904

```
┌─────────────────────────────────────────────────────────────┐
│ A management node allocates first processing tasks to at    │
│ least two computing nodes that include an $FC_x$ and that   │
│ are in a first class of computing nodes, where the $FC_x$   │
│ is the $x^{th}$ computing node in the at least two          │
│ computing nodes, and x is a positive integer; and the at    │── S1001
│ least two computing nodes in the first class of computing   │
│ nodes concurrently process the first processing tasks       │
│ allocated by the management node                            │
└─────────────────────────────────────────────────────────────┘
                              │
┌─────────────────────────────────────────────────────────────┐
│ The computing node $FC_x$ obtains, according to a first     │
│ processing task allocated by the management node, a data    │
│ block $M_{1x}$ and a data block $M_{2x}$ that are in a      │
│ to-be-processed dataset, where the data block $M_{1x}$ is   │── S1002
│ a matrix including m rows and n columns of data, the data   │
│ block $M_{2x}$ is a matrix including n rows and p columns   │
│ of data, m, n, and p are positive integers, and a value of  │
│ n is not less than 2                                        │
└─────────────────────────────────────────────────────────────┘
                              │
┌─────────────────────────────────────────────────────────────┐
│ The computing node $FC_x$ performs a combine combine2       │
│ operation and a reduce reduce2 operation on the data block  │
│ $M_{1x}$ and the data block $M_{2x}$, to obtain a first     │
│ intermediate result $M'_x$, where the first intermediate    │
│ result $M'_x$ is a matrix including m rows and p columns    │
│ of data; and the first intermediate result $M'_x$ has an    │
│ element $m'_{ij}$, where i and j are variants, a value of   │── S1003
│ i ranges from 1 to m, a value of j ranges from 1 to p,      │
│ $m'_{i,j} = m'_{i,j,n}$ $m'_{i,j,n}$ is obtained according  │
│ to $m'_{i,j,k} = reduce2(m'_{i,j,k-1}, combine2(m_{1[i,k]}, │
│ m_{2[k,j]}))$, $m_{1[i,k]}$ is an element in the $i^{th}$   │
│ row and the $k^{th}$ column of the data block $M_{1x}$,     │
│ $m_{2[k,j]}$ is an element in the $k^{th}$ row and the      │
│ $j^{th}$ column of the data block $M_{2x}$, k is a          │
│ variant, and a value of k ranges from 1 to n                │
└─────────────────────────────────────────────────────────────┘
                              │
┌─────────────────────────────────────────────────────────────┐
│ The management node obtains a processing result for the     │
│ to-be-processed dataset according to first intermediate     │── S1004
│ results obtained by the at least two computing nodes in     │
│ the first class of computing nodes                          │
└─────────────────────────────────────────────────────────────┘
```

FIG. 19

DATA PROCESSING SYSTEM, COMPUTING NODE, AND DATA PROCESSING METHOD

CROSS-REFERENCE TO RELATED APPLICATIONS

This application is a continuation of International Application No. PCT/CN2015/072451, filed on Feb. 6, 2015, the disclosure of which is hereby incorporated by reference in its entirety.

TECHNICAL FIELD

The present disclosure relates to the field of computer technologies, and in particular, to a data processing system, a computing node, and a data processing method in the field of graphic computation.

BACKGROUND

With increasing development of information and communication technologies (ICT), data generated in the Internet are exploding. A large amount of valuable information can be obtained by data mining and machine learning on the data. Research objects of data mining and machine learning are usually a set of objects and a relationship between the objects (for example, a social network). The foregoing research objects can be expressed as graphs in a mathematical sense. A graph can be used to describe relationships among objects. Intuitively, the graph may include some small dots and lines connecting the dots. The dots are referred to as vertices of the graph. The lines connecting the dots are referred to as edges.

Therefore, data mining and machine learning algorithms can be converted to operations on a graph, called graph computation. For a graph that can be operated, a data structure needs to be selected to represent the graph. Currently, there are mainly two kinds of representations of a graph: adjacency table and adjacency matrix. In an adjacency table, an object is used to represent a vertex, and a pointer or reference is used to represent an edge. This kind of data structure is adverse to concurrent processing on a graph. An adjacency matrix, referred to as a matrix herein, is a two-dimensional matrix storing adjacencies between vertices. A graph can be concurrently processed well using the matrix data structure. In addition, when data is stored in a matrix, a volume of stored data is relatively small.

Theoretically, the matrix computation in the graph computation may include a matrix-vector multiplication operation and a matrix-matrix multiplication operation. An existing matrix-vector involution operation, such as a generalized iterated matrix-vector multiplication (GIMV), is performing a pairwise combine operation on elements in a row of a matrix and elements in a vector, and after all pairwise combine operations on the elements in the row and the elements in the vector are completed, performing a global combine operation on results of the pairwise combine operations. Consequently, intermediate memory space with a size of a matrix needs to be occupied in a computation process, raising a higher requirement on a system hardware device. In addition, when matrix-vector multiplication is used in a distributed environment, a system needs to transmit a large amount of data; as a result, a large amount of time is consumed for computation.

SUMMARY

Embodiments of the present disclosure provide a data processing system, a computing node, and a data processing method, which can ensure that smaller memory space is occupied during data processing and can reduce a computation time.

According to a first aspect, an embodiment of the present disclosure provides a data processing system, where the data processing system includes a management node and a first class of computing nodes, where the management node is configured to:

allocate first processing tasks to at least two computing nodes that include an $FC_x$ and that are in the first class of computing nodes, where the $FC_x$ is the $x^{th}$ computing node in the at least two computing nodes, and x is a positive integer;

the at least two computing nodes in the first class of computing nodes concurrently process the first processing tasks allocated by the management node;

the computing node $FC_x$ is configured to: obtain, according to a first processing task allocated by the management node, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2; and perform a combine2 operation and a reduce2 operation on the data block $M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i = v'_{i,n}$, $v'_{i,n}$ is obtained according to $v'_{i,j} = \text{reduce2}(v'_{i,j-1}, \text{combine2}(m_{i,j}, v_j))$, $m_{i,j}$ is an element in the data block $M_x$, $v_j$ is an element in the data block $V_{1x}$, j is a variant, and a value of j ranges from 1 to n; and the management node is further configured to obtain a processing result for the to-be-processed dataset according to first intermediate results obtained by the at least two computing nodes in the first class of computing nodes.

With reference to the first aspect, in a first possible implementation manner of the first aspect, the data processing system further includes a second class of computing nodes, and the management node is further configured to:

allocate, according to the first intermediate results obtained by the at least two computing nodes in the first class of computing nodes, a second processing task to at least one computing node that includes an $SC_y$ and that is in the second class of computing nodes, where the $SC_y$ is the $y^{th}$ computing node in the at least one computing node, and y is a positive integer;

the computing node $SC_y$ is configured to:

obtain, according to a second processing task, the first intermediate results obtained by the at least two computing nodes in the first class of computing nodes, where the first intermediate results obtained by the $SC_y$ are first intermediate results obtained according to data blocks in one row in the to-be-processed dataset; and perform a reduce2 operation on the first intermediate results obtained by the $SC_y$, to obtain a second intermediate result $V''_y$, where the second intermediate result $V''_y$ is a vector including m-dimensional data; and the management node is further configured to:

obtain a processing result for the to-be-processed dataset according to a second intermediate result obtained by the at least one computing node in the second class of computing nodes.

According to a second aspect, an embodiment of the present disclosure provides another data processing system, where the data processing system includes a management node and a first class of computing nodes, where the management node is configured to:

allocate first processing tasks to at least two computing nodes that include an $FC_x$ and that are in the first class of computing nodes, where the $FC_x$ is the $x^{th}$ computing node in the at least two computing nodes, and x is a positive integer;

the at least two computing nodes in the first class of computing nodes concurrently process the first processing tasks allocated by the management node;

the computing node $FC_x$ is configured to: obtain, according to a first processing task allocated by the management node, a data block $M_{1x}$ and a data block $M_{2x}$ that are in a to-be-processed dataset, where the data block $M_{1x}$ is a matrix including m rows and n columns of data, the data block $M_{2x}$ is a matrix including n rows and p columns of data, m, n, and p are positive integers, and a value of n is not less than 2; and perform a combine2 operation and a reduce2 operation on the data block $M_{1x}$ and the data block $M_{2x}$, to obtain a first intermediate result $M'_x$, where the first intermediate result $M'_x$ is a matrix including m rows and p columns of data; and the first intermediate result $M'_x$ has an element $m'_{i,j}$, where i and j are variants, a value of i ranges from 1 to m, a value of j ranges from 1 to p, $m'_{i,j}=m'_{i,j,n}$, $m'_{i,j,n}$ is obtained according to $m'_{i,j,k}=\text{reduce2}(m'_{i,j,k-1}, \text{combine2}(m_{1[i,k]}, m_{2[k,j]}))$, $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n; and the management node is further configured to obtain a processing result for the to-be-processed dataset according to first intermediate results obtained by the at least two computing nodes in the first class of computing nodes.

With reference to the second aspect, in a first possible implementation manner of the second aspect, the data processing system further includes a second class of computing nodes, and the management node is further configured to:

allocate, according to the first intermediate results obtained by the at least two computing nodes in the first class of computing nodes, a second processing task to at least one computing node that includes an $SC_y$ and that is in the second class of computing nodes, where the $SC_y$ is the $y^{th}$ computing node in the at least one computing node, and y is a positive integer;

the computing node $SC_y$ is configured to:

obtain, according to a second processing task, the first intermediate results obtained by the at least two computing nodes in the first class of computing nodes, where the first intermediate results obtained by the $SC_y$ are first intermediate results obtained according to data blocks $M_{1x}$ in one row and data blocks $M_{2x}$ in one column that are in the to-be-processed dataset; and perform a reduce2 operation on the first intermediate results obtained by the $SC_y$, to obtain a second intermediate result $M''_y$, where the second intermediate result $M''_y$ is a matrix including m rows and p columns of data; and the management node is further configured to:

obtain a processing result for the to-be-processed dataset according to a second intermediate result obtained by the at least one computing node in the second class of computing nodes.

According to a third aspect, an embodiment of the present disclosure provides a computing node, including:

a receiving module, configured to receive a first processing task allocated by a management node in a data processing system, where the data processing system includes the computing node and the management node;

an obtaining module, configured to obtain, according to the first processing task allocated by the management node and received by the receiving module, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2; and a processing module, configured to perform a combine2 operation and a reduce2 (reduce2) operation on the data block $M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i=v'_{i,n}$, $v'_{i,n}$ is obtained according to $v'_{i,j}=\text{reduce2}(v'_{i,j-1}, \text{combine2}(m_{i,j}, v_j))$, $m_{i,j}$ is an element in the data block $M_x$, $v_j$ is an element in the data block $V_{1x}$, j is a variant, and a value of j ranges from 1 to n.

With reference to the third aspect, in a first possible implementation manner of the third aspect, the computing node is a physical machine, a virtual machine, or a central processing unit CPU.

According to a fourth aspect, an embodiment of the present disclosure provides another computing node, including:

a receiving module, configured to receive a first processing task allocated by a management node in a data processing system, where the data processing system includes the computing node and the management node;

an obtaining module, configured to obtain, according to the first processing task allocated by the management node and received by the receiving module, a data block $M_{1x}$ and a data block $M_{2x}$ that are in a to-be-processed dataset, where the data block $M_{1x}$ is a matrix including m rows and n columns of data, the data block $M_{2x}$ is a matrix including n rows and p columns of data, m, n, and p are positive integers, and a value of n is not less than 2; and a processing module, configured to perform a combine2 operation and a reduce2 operation on the data block $M_{1x}$ and the data block $M_{2x}$, to obtain a first intermediate result $M'_x$, where the first intermediate result $M'_x$ is a matrix including m rows and p columns of data; and the first intermediate result $M'_x$ has an element $m'_{i,j}$, where i and j are variants, a value of i ranges from 1 to m, a value of j ranges from 1 to p, $m'_{i,j}=m'_{i,j,n}$, $m'_{i,j,n}$ is obtained according to $m'_{i,j,k}=\text{reduce2}(m'_{i,j,k-1}, \text{combine2}(m_{1[i,k]}, m_{2[k,j]}))$, $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n.

According to a fifth aspect, an embodiment of the present disclosure provides a data processing method, where the method is applied to a data processing system, the data processing system includes a management node and a first class of computing nodes, and the method includes:

allocating, by the management node, first processing tasks to at least two computing nodes that include an $FC_x$ and that are in the first class of computing nodes, where the $FC_x$ is the $x^{th}$ computing node in the at least two computing nodes, and x is a positive integer; and the at least two computing nodes in the first class of computing nodes concurrently process the first processing tasks allocated by the management node;

obtaining, by the computing node $FC_x$ according to a first processing task allocated by the management node, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2;

performing, by the computing node $FC_x$, a combine2 operation and a reduce2 (reduce2) operation on the data block $M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i=v'_{i,n}$, $v'_{i,n}$ is obtained according to $v'_{i,j}$=reduce2($v'_{i,j-1}$, combine2($m_{i,j}$, $v_j$)), $m_{i,j}$ is an element in the data block $M_x$, $v_j$ is an element in the data block $V_{1x}$, j is a variant, and a value of j ranges from 1 to n; and obtaining, by the management node, a processing result for the to-be-processed dataset according to first intermediate results obtained by the at least two computing nodes in the first class of computing nodes.

With reference to the fifth aspect, in a first possible implementation manner of the fifth aspect, the data processing system further includes a second class of computing nodes, and the method further includes:

allocating, by the management node according to the first intermediate results obtained by the at least two computing nodes in the first class of computing nodes, a second processing task to at least one computing node that includes an $SC_y$ and that is in the second class of computing nodes, where the $SC_y$ is the $y^{th}$ computing node in the at least one computing node, and y is a positive integer;

obtaining, by the computing node $SC_y$ according to the second processing task, the first intermediate results obtained by the at least two computing nodes in the first class of computing nodes, where the first intermediate results obtained by the $SC_y$ are first intermediate results obtained according to data blocks in one row in the to-be-processed dataset;

performing, by the computing node $SC_y$, a reduce2 operation on the first intermediate results obtained by the $SC_y$, to obtain a second intermediate result $V''_y$, where the second intermediate result $V''_y$ is a vector including m-dimensional data; and obtaining, by the management node, a processing result for the to-be-processed dataset according to a second intermediate result obtained by the at least one computing node in the second class of computing nodes.

With reference to the first possible implementation manner of the fifth aspect, in a second possible implementation manner, the dataset further includes a data block $V_{2x}$, and the data block $V_{2x}$ is a vector including m-dimensional data; and the method further includes:

allocating, by the management node according to the second intermediate result obtained by the at least one computing node that includes the $SC_y$ and that is in the second class of computing nodes, a third processing task to the at least one computing node that includes the $SC_y$ and that is in the second class of computing nodes;

obtaining, by the computing node $SC_y$, the data block $V_{2x}$ in the dataset according to the third processing task; and performing, by the computing node $SC_y$, an assign operation on the second intermediate result $V''_y$ and the data block $V_{2x}$ that are obtained by the $SC_y$, to obtain a processing result for the to-be-processed dataset.

According to a sixth aspect, an embodiment of the present disclosure provides another data processing method, where the method is applied to a data processing system, the data processing system includes a management node and a first class of computing nodes, and the method includes:

allocating, by the management node, first processing tasks to at least two computing nodes that include an $FC_x$ and that are in the first class of computing nodes, where the $FC_x$ is the $x^{th}$ computing node in the at least two computing nodes, and x is a positive integer; and the at least two computing nodes in the first class of computing nodes concurrently process the first processing tasks allocated by the management node;

obtaining, by the computing node $FC_x$ according to a first processing task allocated by the management node, a data block $M_{1x}$ and a data block $M_{2x}$ that are in a to-be-processed dataset, where the data block $M_{1x}$ is a matrix including m rows and n columns of data, the data block $M_{2x}$ is a matrix including n rows and p columns of data, m, n, and p are positive integers, and a value of n is not less than 2;

performing, by the computing node FC, a combine2 operation and a reduce2 operation on the data block $M_{1x}$ and the data block $M_{2x}$, to obtain a first intermediate result $M'_x$, where the first intermediate result $M'_x$ is a matrix including m rows and p columns of data; and the first intermediate result $M'_x$ has an element $m'_{i,j}$, where i and j are variants, a value of i ranges from 1 to m, a value of j ranges from 1 to p, $m'_{i,j}=m'_{i,j,n}$, $m'_{i,j,n}$ is obtained according to $m'_{i,j,k}$=reduce2 ($m'_{i,j,k-1}$, combine2($m_{1[i,k]}$, $m_{2[k,j]}$)), $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n; and obtaining, by the management node, a processing result for the to-be-processed dataset according to first intermediate results obtained by the at least two computing nodes in the first class of computing nodes.

With reference to the sixth aspect, in a first possible implementation manner, the data processing system further includes a second class of computing nodes, and the method further includes:

allocating, by the management node according to the first intermediate results obtained by the at least two computing nodes in the first class of computing nodes, a second processing task to at least one computing node that includes an $SC_y$ and that is in the second class of computing nodes, where the $SC_y$ is the $y^{th}$ computing node in the at least one computing node, and y is a positive integer;

obtaining, by the computing node $SC_y$ according to the second processing task, the first intermediate results obtained by the at least two computing nodes in the first class of computing nodes, where the first intermediate results obtained by the $SC_y$ are first intermediate results obtained according to data blocks $M_{1x}$ in one row and data blocks $M_{2x}$ in one column that are in the to-be-processed dataset;

performing, by the computing node $SC_y$, a reduce2 operation on the first intermediate results obtained by the $SC_y$, to obtain a second intermediate result $M''_y$, where the second intermediate result $M''_y$ is a matrix including m rows and p columns of data; and obtaining, by the management node, a processing result for the to-be-processed dataset according to a second intermediate result obtained by the at least one computing node in the second class of computing nodes.

With reference to the first possible implementation manner of the sixth aspect, in a second possible implementation manner, the dataset further includes a data block $M_{3x}$, and the data block $M_{3x}$ is a matrix including m rows and p columns of data; and the method further includes:

allocating, by the management node according to the second intermediate result obtained by the at least one computing node that includes the $SC_y$ and that is in the second class of computing nodes, a third processing task to the at least one computing node that includes the $SC_y$, and that is in the second class of computing nodes;

obtaining, by the computing node $SC_y$, the data block $M_{3x}$ in the dataset according to the third processing task; and performing, by the computing node $SC_y$, an assign operation on the second intermediate result $M''_y$ and the data block $M_{3x}$ that are obtained by the $SC_y$, to obtain a processing result for the to-be-processed dataset.

Based on the foregoing technical solutions, according to the data processing system, the computing node, and the data processing method that are provided by the embodiments of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

BRIEF DESCRIPTION OF DRAWINGS

The following briefly introduces the accompanying drawings used in describing the embodiments.

FIG. 18 is a flowchart of a data processing method according to an embodiment of the present disclosure; and FIG. 19 is a flowchart of another data processing method according to an embodiment of the present disclosure.

DESCRIPTION OF EMBODIMENTS

The following describes the technical solutions in the embodiments of the present disclosure with reference to the accompanying drawings. Apparently, the described embodiments are a part rather than all of the embodiments of the present disclosure.

For ease of understanding, concepts and related technologies that are involved in this specification are described briefly first.

Figure 1:
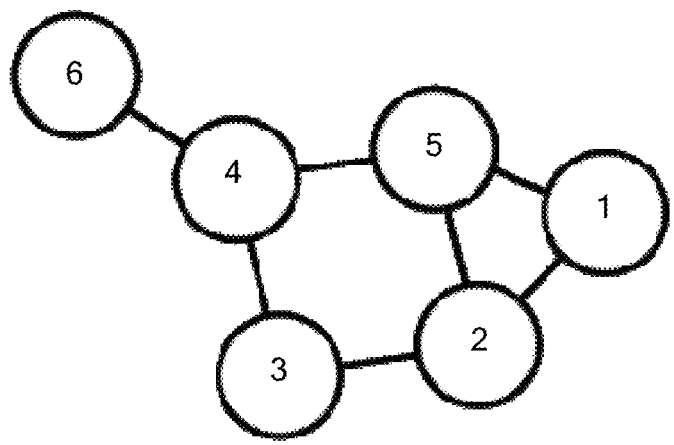
FIG. 1 is a schematic diagram of a "graph" according to an embodiment of the present disclosure.
Figure 2:
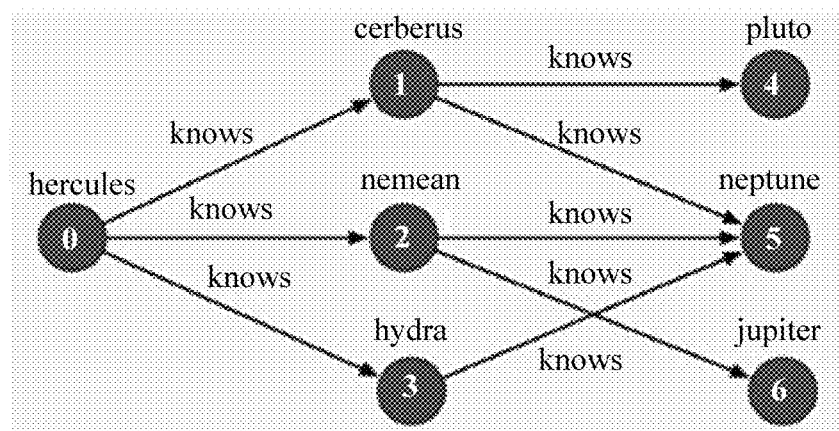
FIG. 2 is another schematic diagram of a "graph" according to an embodiment of the present disclosure.

Graph:

A graph is used to describe relationships between objects. Intuitively, a graph includes some dots and lines connecting the dots. The dots are referred to as vertices of the graph. The lines connecting the dots are referred to as edges. An edge may be classified into an undirected edge shown in FIG. 1 and a directed edge shown in FIG. 2. FIG. 1 involves six objects 1 to 6, and relationships between the six objects are represented by undirected edges between the six objects. FIG. 2 involves seven objects 0 to 6, and unidirectional relationships between the seven objects are represented by directed edges between the seven objects. When a relationship between objects is represented by a directed edge, a graph can be referred to as a directed graph.

Multiplication:

In this specification, multiplication may represent generalized multiplication, or may represent multiplication of two numbers. For example, a multiplication in matrix-vector multiplication is a generalized multiplication. That is, a multiplication of an element in a matrix and an element corresponding to a vector is not a traditional multiplication of numbers, but may be other processing such as addition, subtraction, multiplication, division, maximization, or minimization, which is not limited in the embodiments of the present disclosure.

Figures 3A, 3B:
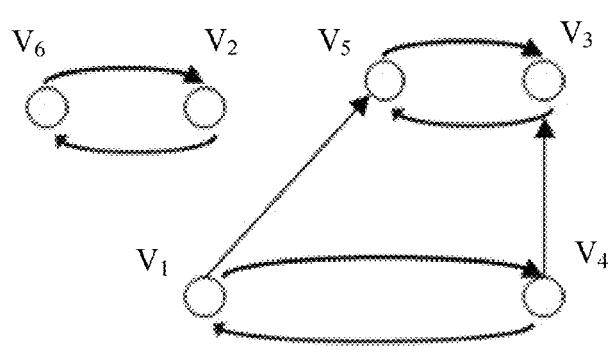
FIG. 3A is a schematic diagram of a "directed graph" representing a relationship between objects.
FIG. 3B shows an adjacency matrix corresponding to the "directed graph" in FIG. 3A.

Adjacency Matrix:

The adjacency matrix, referred to as a matrix in this specification, is a two-dimensional matrix storing adjacency between vertices in a graph. As shown in FIG. 3A and FIG. 3B, FIG. 3A is a directed graph and involves six vertices $V_1$ to $V_6$, where directed edges represent mutual relationships between the six vertices; FIG. 3B shows a representation form of a corresponding adjacency matrix. An adjacency matrix is used to represent a graph, which can facilitate concurrent processing on the graph. A matrix can be classified into a dense matrix or a sparse matrix. The dense matrix is generally represented using a vector or a bi-vector (that is, a vector of a vector) and can be classified into a matrix in row-major order or a matrix in column-major order. The sparse matrix (with nonzero elements stored) generally has three storage formats: COO, CSR, and CSC. A zero element in a matrix representation (or, for example, an infinite element in an SSSP algorithm) does not need to be stored during storage; therefore, a volume of stored data can be reduced by representing a graph using a matrix. In an adjacency matrix representation, most operations for a graph may be converted to a matrix-vector multiplication (that is, multiplication of a matrix and a vector) operation, or a matrix-matrix multiplication (that is, multiplication of a matrix and a matrix) operation.

Figures 4, 5, 6A, 6B:
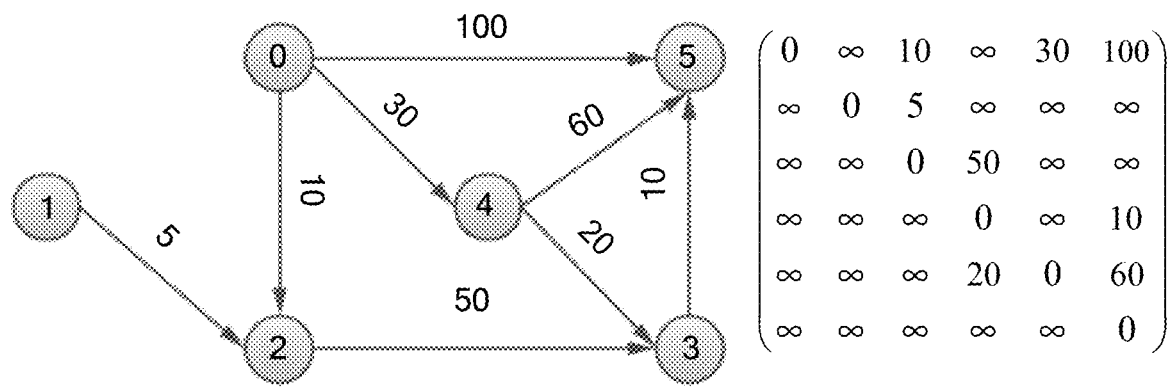
FIG. 4 is a schematic diagram of a matrix-vector multiplication operation.
FIG. 5 is a schematic diagram of a matrix-matrix multiplication operation.
FIG. 6A is a schematic diagram of a "weighted directed graph" representing a relationship between objects.
FIG. 6B shows an adjacency matrix corresponding to the "weighted directed graph" in FIG. 6A.

Matrix-vector Multiplication Operation:

The matrix-vector multiplication operation refers to a series of operations between a matrix and a vector. In an example of representing graph computation using a matrix-vector multiplication operation, all friends of $V_2$ in the directed graph in FIG. 3A can be searched for in a manner of matrix-vector multiplication shown in FIG. 4. First, a query vector is constructed. Because outneighbors of $V_2$ are to be searched for, the $2^{nd}$ element in the vector is set to 1, and the other elements are set to 0. Second, because the outneighbors are to be searched for, an adjacency matrix needs to be transposed. Finally, an adjacency matrix obtained after the transposition and the constructed vector are multiplied (as shown in FIG. 4), to obtain a resultant vector. The $6^{th}$ bit of the resultant vector shown in the figure is 1, indicating that $V_2$ has an only friend $V_6$. This result can be verified in FIG. 3A.

Matrix-matrix Multiplication Operation:

The matrix-matrix multiplication operation refers to a series of operations between matrices. In an example of representing graph computation using a matrix-matrix multiplication operation, a quantity of mutual friends (for example, outneighbors) of every two vertices in FIG. 3A can be computed using a matrix-matrix multiplication operation. First, an adjacency matrix is constructed. As shown by the matrix in FIG. 3B, herein, the matrix is represented using A. Then a value of an element $b_{ij}$ in a matrix B is obtained by executing $B=(b_{ij})=A*A^T$ (as shown in FIG. 5) and represents a quantity of mutual outneighbors of the $i^{th}$ vertex and the $j^{th}$ vertex. For example, a value in row 3 and column 1 is 1, indicating that a vertex 3 and a vertex 1 have one mutual friend.

Distributed Matrix:

Multiple computation units used for computation are included in a cluster environment. Matrix-vector multiplication operations and matrix-matrix multiplication operations are both performed based on matrix partitioning. After being partitioned, a matrix may be referred to as a distributed matrix. Concurrent processing may be performed on the distributed matrix using the multiple computation units.

In the following, brief descriptions of a prior-art matrix-vector multiplication model are provided.

A traditional matrix operation is only for numerical values, and limitations are imposed on specific operations. For example, a traditional matrix-vector multiplication is shown in formula 1 below, an operation between $M_{ij}$ and $V_j$ cannot be anything but a multiplication, and an operation between products of a row of a matrix and a vector (each product is recorded as $x_j=M_{ij}V_j$) cannot be anything but an addition. As a result, an algorithm that can be represented by a matrix operation is greatly limited. For example, an SSSP algorithm cannot be represented by the traditional matrix-vector multiplication.

$$M*V = V', \quad V' = \sum_{j=1}^{n} M_{ij}V_j \qquad \text{(formula 1)}$$

where M is a matrix with m rows and n columns and $M_{ij}$ is a matrix block obtained after M is partitioned; V is an n-dimensional column vector, and $V_j$ is a vector block after V is partitioned; and V' is an m-dimensional column vector.

For the limitations of the prior-art matrix-vector multiplication model, a GIMV model is proposed based on a big data processing system PEGASUS for matrix-vector multiplication operations. The GIMV model extends the traditional matrix-vector multiplication in:

1. Processing on $M_{ij}$ and $V_j$ is extended to a combine2 operation, where the combine2 is a combine operation performed on a matrix element and a vector element. Types of the matrix element and the vector element may be different, and the combine2 operation may be addition, subtraction, multiplication, division, maximization, minimization, or the like, which is not limited in the embodiments of the present disclosure; and an intermediate value $x_j$ is returned after the combine2.

2. A combineAll operation is performed on combine2 results $x_1, \ldots,$ and $x_n$ for a row of a matrix, where the combineAll is a combine operation performed on multiple numerical values or a record set, and is generally a function (which may be, for example, an accumulation function), and an intermediate value $\nabla_i$ is returned after the combineAll.

3. An assign operation is performed on the $\nabla_i$ currently obtained through computation and an element $V_i$ of an initial vector V, to obtain a value $V'_i$ of an element in a currently computed resultant vector.

According to the GIMV model, a matrix M and a vector V are input, and a vector V' is output after the three operations. There are mainly three operators for the operations:

$$M \otimes V = V' \qquad \text{(formula 2)}$$

where 1. combine2($M_{ij}, V_j$): a combine operation is performed on $M_{ij}$ and $V_j$, to obtain an intermediate result $x_j$;

2. combineAll($x_1, \ldots, x_n$): a combine operation is performed on intermediate results $x_1, \ldots,$ and $x_n$ for a row of a matrix, to obtain an intermediate result $\nabla_i$; and 3. assign($V_i, \nabla_i$): an assign operation is performed on an element $V_i$ in the initial vector and the corresponding intermediate result $\nabla_i$, to obtain a value $V'_i$ of an element in a resultant vector.

The GIMV model can represent more algorithms. For example, an SSSP algorithm may correspond to the following: a combine2 operation is an "addition" operation, that is, combine2($M_{ij}, V_j$)=$M_{ij}$+$V_j$; a combineAll operation is a "minimization" operation, that is, combineAll($x_1, \ldots, x_n$)=min($x_1, \ldots, x_n$); and an assign operation is also a "minimization" operation, that is, assign($V_i, \nabla_i$)=min($V_i, \nabla_i$).

FIG. 6A shows a weighted directed graph, and FIG. 6B shows a corresponding adjacency matrix M. A value in the matrix M is a distance weight of two points, a distance from a vertex to the vertex itself is 0, and being unreachable is represented by infinity. To solve for a shortest distance from a vertex 0 to all other vertices, iterated matrix-vector multiplication may be used. Each iteration represents a shortest distance obtained by adding 1 to a hop count (for example, there is one hop from a vertex 1 to a vertex 2, and there are two hops from the vertex 1 to a vertex 3 through the vertex 2).

Figure 7:
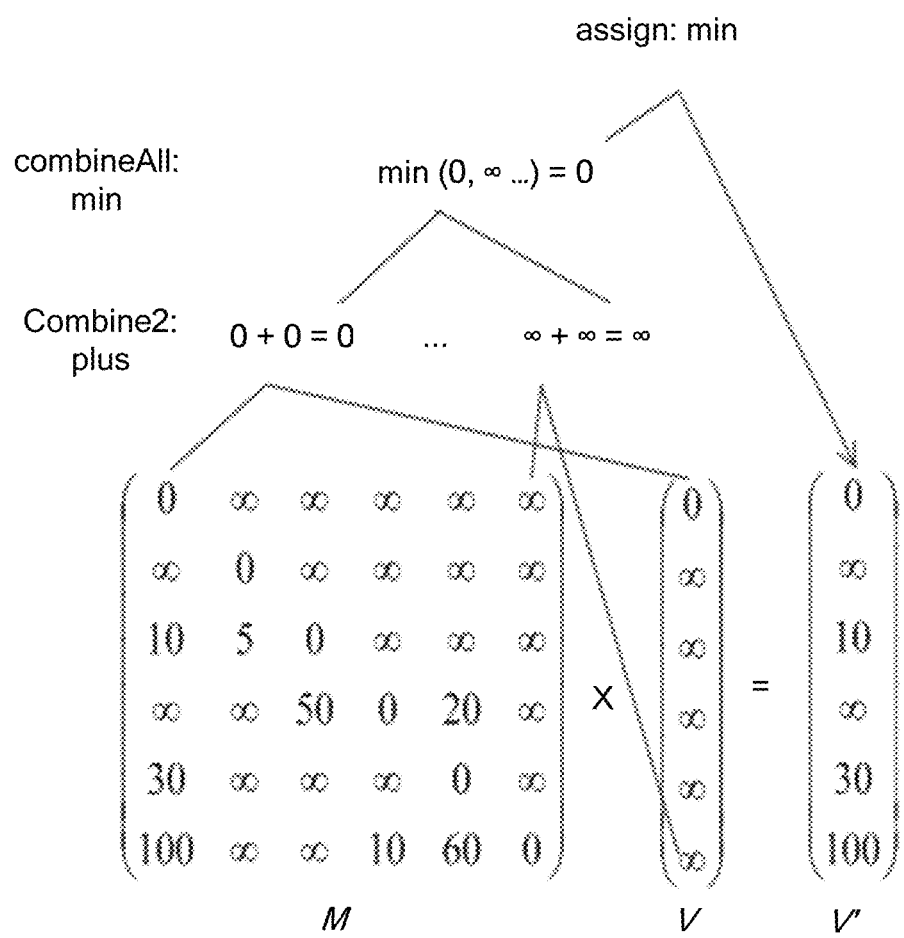
FIG. 7 is a schematic diagram of another matrix-vector multiplication operation.

In the algorithm, an initial vector V is first constructed and starts from a vertex 0; therefore, a value at a location 0 (an element in the $1^{st}$ row) of the initial vector V is 0, as shown by V in FIG. 7. During computation, a result obtained after the adjacency matrix M in FIG. 6B is transposed is multiplied by the initial vector V, and then operations are performed using the three operators in the SSSP algorithm: combine2($M_{ij}, V_j$)=$M_{ij}$+$V_j$, combineAll($x_1, \ldots, x_n$)=min($x_1, \ldots, x_n$), and assign($V_i, \nabla_i$)=min($V_i, \nabla_i$). A resultant vector V' obtained through multiplication for the first time represents a shortest distance from the vertex 0 to other vertices that can be reached after one hop. An iteration termination condition in the SSSP algorithm is: if a resultant vector V' obtained through iteration does not change compared with an initial vector V of the iteration, the algorithm terminates. If the termination condition is not met, iteration continues to be performed in the algorithm. That is, the resultant vector V' of the current iteration is used as an initial vector V of next iteration to perform the next iteration, and a final resultant vector V' obtained according to the algorithm is the shortest distance from the vertex 0 to the other vertices.

An execution procedure of the GIMV model is: a combineAll operation can be performed on all combine2 results for a row of a matrix only after all combine2 operations are completed. Therefore, in the computation process, the combineAll operation needs to occupy intermediate memory space with a size of a matrix. In addition, in a distributed environment, a system needs to transmit a large amount of data. An assign operation is an operation performed on an initial vector V and an intermediate vector $\bar{V}$ that is obtained using the combineAll. Therefore, dimensions of two vectors need to be equal. From another perspective, the matrix M needs to be a square matrix. Moreover, a vector in the assign operation cannot be anything but the initial vector V, which also limits a representation range of the GIMV model.

In the present disclosure, a data processing method is proposed for an improvement towards overcoming the shortcomings in the foregoing solutions, so as to reduce intermediate memory occupancy and volume of transmitted data in a matrix-vector multiplication operation process in data processing. In addition, based on a principle similar to that of the matrix-vector multiplication operation in the present disclosure, a matrix-matrix multiplication operation model is proposed, so that more algorithms can be expressed.

Figure 8:
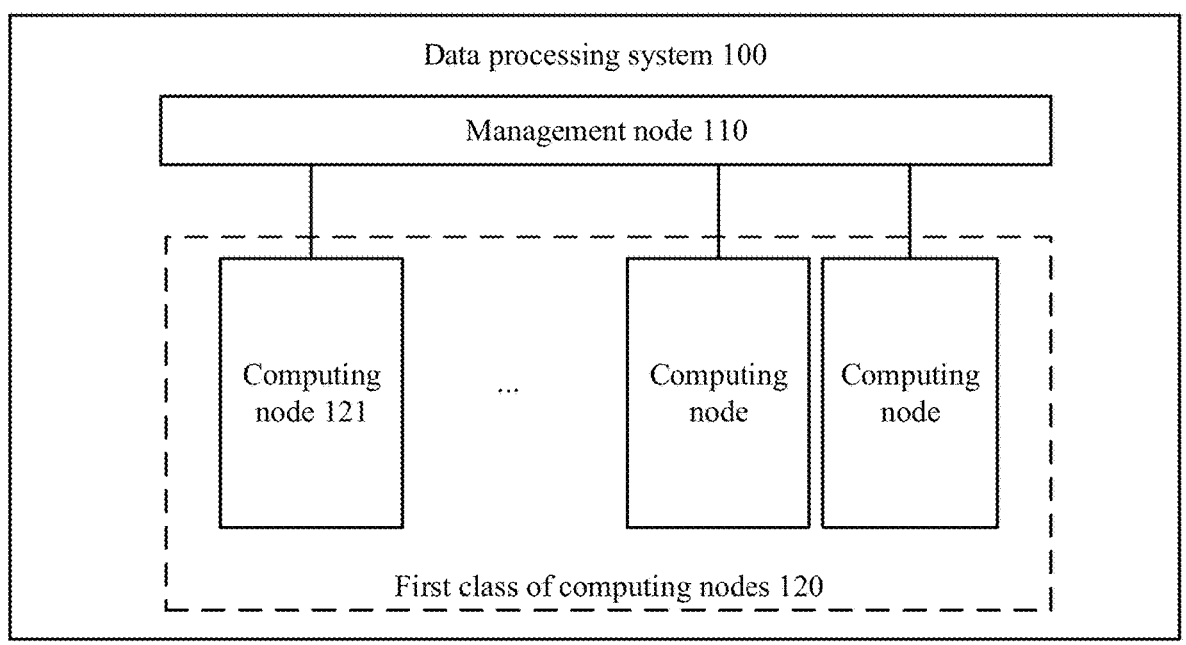
FIG. 8 is a simplified block diagram of a data processing system according to an embodiment of the present disclosure.

FIG. 8 is a schematic block diagram of a data processing system 100 according to an embodiment of the present disclosure. As shown in FIG. 8, the data processing system 100 includes a management node 110, and a first class of computing nodes 120 that includes a plurality of computing nodes 121.

The management node 110 is configured to:

allocate first processing tasks to at least two computing nodes that include a computing node $FC_x$ 121 and that are in the first class of computing nodes 120, where the $FC_x$ 121 is the $x^{th}$ computing node in the at least two computing nodes, and x is a positive integer.

The at least two computing nodes in the first class of computing nodes 120 concurrently process the first processing tasks allocated by the management node 110.

The computing node $FC_x$ 121 is configured to: obtain, according to a first processing task allocated by the management node 110, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2; and perform a combine (for example, combine2) operation and a reduce (for example, reduce2) operation on the data block $M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i = v'_{i,n}$, $v'_{i,n}$ is obtained according to $v'_{i,j} = reduce2(v'_{i,j-1}, combine2(m_{i,j}, v_j))$, $m_{i,j}$ is an element in the data block $M_x$, $v_j$ is an element in the data block $V_{1x}$, j is a variant, and a value of j ranges from 1 to n.

The management node 110 is further configured to obtain a processing result for the to-be-processed dataset according to first intermediate results obtained by the at least two computing nodes in the first class of computing nodes 120.

Therefore, according to the data processing system provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Specifically, the data processing system 100 provided by this embodiment of the present disclosure may be applied to big data processing. Because a volume of data for big data processing is relatively large, the data is usually partitioned, and different data blocks are distributed to different computing nodes for concurrent computation, so as to improve computation efficiency. The data processing system 100 includes the management node 110 and the first class of computing nodes 120. The management node 110 is configured to: receive a data processing task, partition the data processing task into multiple processing tasks, and deliver the processing tasks to computing nodes. The management node 110 is further configured to receive statuses of executing the processing tasks of the computing nodes by the computing nodes, so as to manage a data processing process. The computing nodes are configured to: receive the processing tasks delivered by the management node 110, and obtain data blocks according to the processing tasks, so as to execute the corresponding processing tasks. A computing node may obtain a data block stored in the computing node, to execute a processing task, or may obtain a data block stored in another computing node, to execute a processing task. Because classes of processing tasks are different, the computing nodes may be classified according to the classes of the processing tasks of the computing nodes. For example, a first class of nodes process first processing tasks, and a second class of nodes process second processing tasks.

In this embodiment of the present disclosure, the management node 110 is configured to allocate the first processing tasks to the at least two computing nodes that include the $FC_x$ 121 and that are in the first class of computing nodes 120, where the $FC_x$ 121 is the $x^{th}$ computing node in the at least two computing nodes, and x is a positive integer. The at least two computing nodes in the first class of computing nodes 120 concurrently process the first processing tasks allocated by the management node 110.

After receiving the first processing task allocated by the management node 110, the computing node $FC_x$ 121 obtains, according to the first processing task, the data block $M_x$ and the data block $V_{1x}$ that are in the to-be-processed dataset, where the data block $M_x$ is a matrix including m rows and n columns of data, the data block $V_{1x}$ is a vector including n-dimensional data, m and n are positive integers, and a value of n is not less than 2. Processing on the data block $M_x$ and the data block $V_{1x}$ may be regarded as a matrix-vector multiplication operation.

The computing node $FC_x$ 121 performs the combine (for example, combine2) operation and the reduce (for example, reduce2) operation on the data block $M_x$ and the data block $V_{1x}$, to obtain the first intermediate result $V'_x$, where the first intermediate result $V'_x$ is a vector including m-dimensional data. The first intermediate result $V'_x$ has an element $v'_i$, where i is a variant, a value of i ranges from 1 to m, $v'_i = v'_{i,n}$, $v'_{i,n}$ is obtained according to $v'_{i,j} = reduce2(v'_{i,j-1}, combine2$ ($m_{i,j}$, $v_j$)), $m_{i,j}$ is an element in the data block $M_x$, $v_j$ is an element in the data block $V_{1x}$, j is a variant, and a value of j ranges from 1 to n.

Specifically, the combine operation is performed on an element in the $i^{th}$ row and the $j^{th}$ column of the data block $M_x$ and an element in the $j^{th}$ row of the data block $V_{1x}$, to obtain an intermediate result $x_j$ corresponding to the element in the $i^{th}$ row and the $j^{th}$ column of the data block $M_x$ and the element in the $j^{th}$ row of the data block $V_{1x}$. The combine operation herein may be the combine2 processing described above, and may be used in a formula to express the intermediate result: $x_j$=combine2($m_{i,j}$, $v_j$).

Then, the reduce2 operation is performed on an intermediate result $x_j$ corresponding to the $i^{th}$ row of the data block $M_x$, to obtain an element $v'_i$ corresponding to the $i^{th}$ row of the data block $M_x$, where the value of i ranges from 1 to m; in this case, the first intermediate result $V'_x$ can be obtained. The combine2 operation and the reduce2 operation may be: first computing $x_1$ and $x_2$, and performing a reduce2 operation on $x_1$ and $x_2$; then computing $x_3$, and performing a reduce2 operation on $x_3$ and a result obtained after the reduce2 operation is performed on $x_1$ and $x_2$; . . . , until each element of the intermediate result $x_j$ corresponding to the $i^{th}$ row of the data block $M_x$ has undergone a reduce2 operation. The reduce2 operations are not performed after all combine2 operations are completed, but the combine2 operations and the reduce2 operations are performed alternately. In this way, the intermediate result $x_j$ that has undergone the reduce2 operation in the computation process can be deleted, and there is no need to store results of all the combine2 operations in a memory; therefore, memory space can be reduced.

It should be understood that the foregoing process is in essence an update process. That is, a reduce2 operation is first performed to obtain an intermediate result obtained after the reduce2 operation is performed on two $x_j$, and then a reduce2 operation is performed on the obtained intermediate result and another $x_j$ or another intermediate result to obtain an intermediate result, so as to continuously update an intermediate result.

The reduce2 operation herein may be addition, subtraction, multiplication, division, maximization, minimization, or the like, which is not limited in this embodiment of the present disclosure. Herein, for processing, using the reduce2 operation, on intermediate results (for example, $x_1$, . . . , $x_n$) corresponding to elements in a row of a matrix, reduce2 processing is performed step by step in a process of computing an intermediate result $x_j$, instead of being performed after all of $x_1$, . . . , $x_n$ are computed.

It should be understood that an advantage of the reduce2 operation is: a sequence of elements on which reduce2 operations are performed does not need to be considered in a computation process, that is, an only result is obtained regardless of the sequence of the elements on which the reduce2 operations are performed. For example, in the Scala language, an array is it=Array(0,1,2,3,4,5), and elements in the array are summed, which may be expressed as it.reduce (_+_). During specific implementation of computation, a value obtained by adding data from left to right is the same as a final value obtained by performing pairwise reduce2 operation on the data. The foregoing description of performing the reduce2 operation on $x_3$ and the result obtained after the reduce2 operation is performed on $x_1$ and $x_2$ is only one implementation manner. An execution sequence of reduce2 operations is not limited to a sequence of $x_1$, . . . , $x_n$. A result the same as that obtained after sequential execution can be obtained by performing a reduce2 operation on any two of $x_1$, . . . , $x_n$ and then performing a reduce2 operation on an obtained result and another $x_j$. No limitation is imposed on a reduce2 operation sequence in this embodiment of the present disclosure.

The management node 110 is further configured to obtain the processing result for the to-be-processed dataset according to the first intermediate results obtained by the at least two computing nodes in the first class of computing nodes 120. After completing the first processing tasks, the first class of computing nodes 120 notify the management node 110. The management node 110 obtains the processing result for the to-be-processed dataset according to the first intermediate results obtained by the at least two computing nodes in the first class of computing nodes 120, or delivers, to a corresponding computing node using the first intermediate results as basic data for another processing task, the another processing task that is to be computed using the first intermediate results.

Therefore, according to the data processing system provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Optionally, in an embodiment, the data processing system 100 further includes a second class of computing nodes, and the management node 110 is further configured to:

allocate, according to the first intermediate results obtained by the at least two computing nodes in the first class of computing nodes 120, a second processing task to at least one computing node that includes an $SC_y$ and that is in the second class of computing nodes, where the $SC_y$ is the $y^{th}$ computing node in the at least one computing node, and y is a positive integer.

The computing node $SC_y$ is configured to:

obtain, according to a second processing task, the first intermediate results obtained by the at least two computing nodes in the first class of computing nodes 120, where the first intermediate results obtained by the $SC_y$ are first intermediate results obtained according to data blocks in one row in the to-be-processed dataset; and perform a reduce2 operation on the first intermediate results obtained by the $SC_y$, to obtain a second intermediate result $V''_y$, where the second intermediate result $V''_y$ is a vector including m-dimensional data.

The management node 110 is further configured to:

obtain a processing result for the to-be-processed dataset according to a second intermediate result obtained by the at least one computing node in the second class of computing nodes.

Specifically, after the foregoing processing is completed, other processing may be further performed on the first intermediate results obtained by the first class of computing nodes 120. For example, when the data blocks $M_x$ processed by the at least two computing nodes in the first class of computing nodes 120 are data blocks in one row in the to-be-processed dataset, the management node 110 may allocate, according to the first intermediate results obtained by the at least two computing nodes in the first class of computing nodes 120, the second processing task to the at least one computing node that includes the $SC_y$ and that is in the second class of computing nodes, where the $SC_y$ is the $y^{th}$ computing node in the at least one computing node, and y is a positive integer.

The computing node $SC_y$ is configured to obtain, according to a second processing task, the first intermediate results obtained by the at least two computing nodes in the first class of computing nodes 120, where the first intermediate results obtained by the $SC_y$ are first intermediate results obtained according to data blocks in one row in the to-be-processed dataset. The second processing task is performing a reduce2 operation on the first intermediate results obtained by the $SC_y$, to obtain the second intermediate result $V''_y$, where the second intermediate result $V''_y$ is a vector including m-dimensional data. The reduce2 operation performed on the first intermediate results obtained by the $SC_y$ is similar to the reduce2 operation described above. That is, a reduce2 operation is first performed on two first intermediate results obtained using data blocks in one row in the to-be-processed dataset, and then a reduce2 operation is performed on a result of the foregoing reduce2 operation and another first intermediate result.

The management node 110 is specifically configured to obtain the processing result for the to-be-processed dataset according to the second intermediate result obtained by the at least one computing node in the second class of computing nodes.

Optionally, in an embodiment, the dataset further includes a data block $V_{2x}$, and the data block $V_{2x}$ is a vector including m-dimensional data. The management node 110 is further specifically configured to:

allocate, according to the second intermediate result obtained by the at least one computing node that includes the $SC_y$ and that is in the second class of computing nodes, a third processing task to the at least one computing node that includes the $SC_y$ and that is in the second class of computing nodes.

The computing node $SC_y$ is further configured to:

obtain the data block $V_{2x}$ in the dataset according to the third processing task; and perform an assign operation on the second intermediate result $V''_y$ and the data block $V_{2x}$ that are obtained by the $SC_y$, to obtain a processing result for the to-be-processed dataset.

Specifically, after a reduce2 operation is performed on first intermediate results obtained using data blocks in one row in the to-be-processed dataset, an assign operation may be further performed on an obtained second intermediate result, so as to obtain the processing result for the to-be-processed dataset. Both the second intermediate result $V''_y$ and the data block $V_{2x}$ are vectors including m-dimensional data. A resultant vector may be obtained by performing an assign operation on corresponding elements, where the resultant vector is an m-dimensional column vector. The assign processing herein may be the assign processing described above, and may be used in a formula to express an element $V_{3,i}=\text{assign}(V''_i, V_{2,i})$ in a resultant vector, where m $V_{3,i}$ form the resultant vector $V_{3x}$.

The foregoing is a matrix-vector multiplication operation process. In conclusion, the matrix-vector multiplication operation in this embodiment of the present disclosure may be expressed as the following formula 3:

$$M \otimes V_1 \oplus V_2 = V_3 \qquad \text{(formula 3)}$$

Relative to an existing GIMV model, the vector $V_2$ is added in the assign processing in this embodiment of the present disclosure; therefore, the resultant vector $V_3$ may be expressed as:

$$V_3 = \alpha * M * V_1 + \beta * V_2 \qquad \text{(formula 4)},$$

where $\alpha$ and $\beta$ are numerical values, and formula 4 shows that, relative to the existing GIMV model, the weight $V_2$ is introduced to the resultant vector $V_3$ obtained by the data processing system 100 in this embodiment of the present disclosure, so that the assign processing is no longer limited to a vector used for multiplication, and a matrix-vector multiplication operation on a non-square matrix can be supported, expanding an expression range of the matrix-vector multiplication operation.

The following uses a specific example to describe a function of introducing the weight $V_2$ to the matrix-vector multiplication operation. For example, in the PageRank algorithm used for a performance test, "a vector used for addition" (corresponding to the foregoing vector $V_2$) is often set to $(1-d)/N$ for an operation. The vector $(1-d)/N$ may be used to adjust PageRank values of vertices in a corresponding graph, so that the PageRank values of the vertices better meet reality. The PageRank value may be expressed as R, and is specifically expressed as formula 5:

$$R = \begin{bmatrix} (1-d)/N \\ (1-d)/N \\ \vdots \\ (1-d)/N \end{bmatrix} + d \begin{bmatrix} l(p_1, p_1) & l(p_1, p_2) & \cdots & l(p_1, p_N) \\ l(p_2, p_1) & \ddots & & \\ \vdots & & l(p_i, p_j) & \\ l(p_N, p_1) & & & l(p_N, p_N) \end{bmatrix} R \qquad \text{(formula 5)}$$

For example, for some official websites, values of vertices corresponding to the official websites may be set relatively large in a vector; in this case, obtained resultant PageRank values are generally relatively large.

Optionally, in an embodiment, m=n, and the data block $V_{1x}$ and the data block $V_{2x}$ are a same data block. That is, the data block $V_{1x}$ together with which an operation is performed on the data block $M_x$ and the data block $V_{2x}$ used for performing the assign operation are a same data block.

Optionally, in an embodiment, when the second class of computing nodes include at least two computing nodes, the at least two computing nodes in the second class of computing nodes concurrently process second processing tasks allocated by the management node. When the to-be-processed dataset is partitioned both by row and by column, at least two of the second class of computing nodes are required to process the second processing task. When the to-be-processed dataset is partitioned only by column, one of the second class of computing nodes is required. When the to-be-processed dataset is partitioned only by row, no second class of computing nodes is required, that is, the second processing task does not need to be processed.

Optionally, in an embodiment, the management node, the first class of computing nodes, and the second class of computing nodes each may be a physical machine, a virtual machine, or a central processing unit (CPU), which is not limited in this embodiment of the present disclosure.

The following describes in detail this embodiment of the present disclosure with reference to a specific example.

Figure 9:
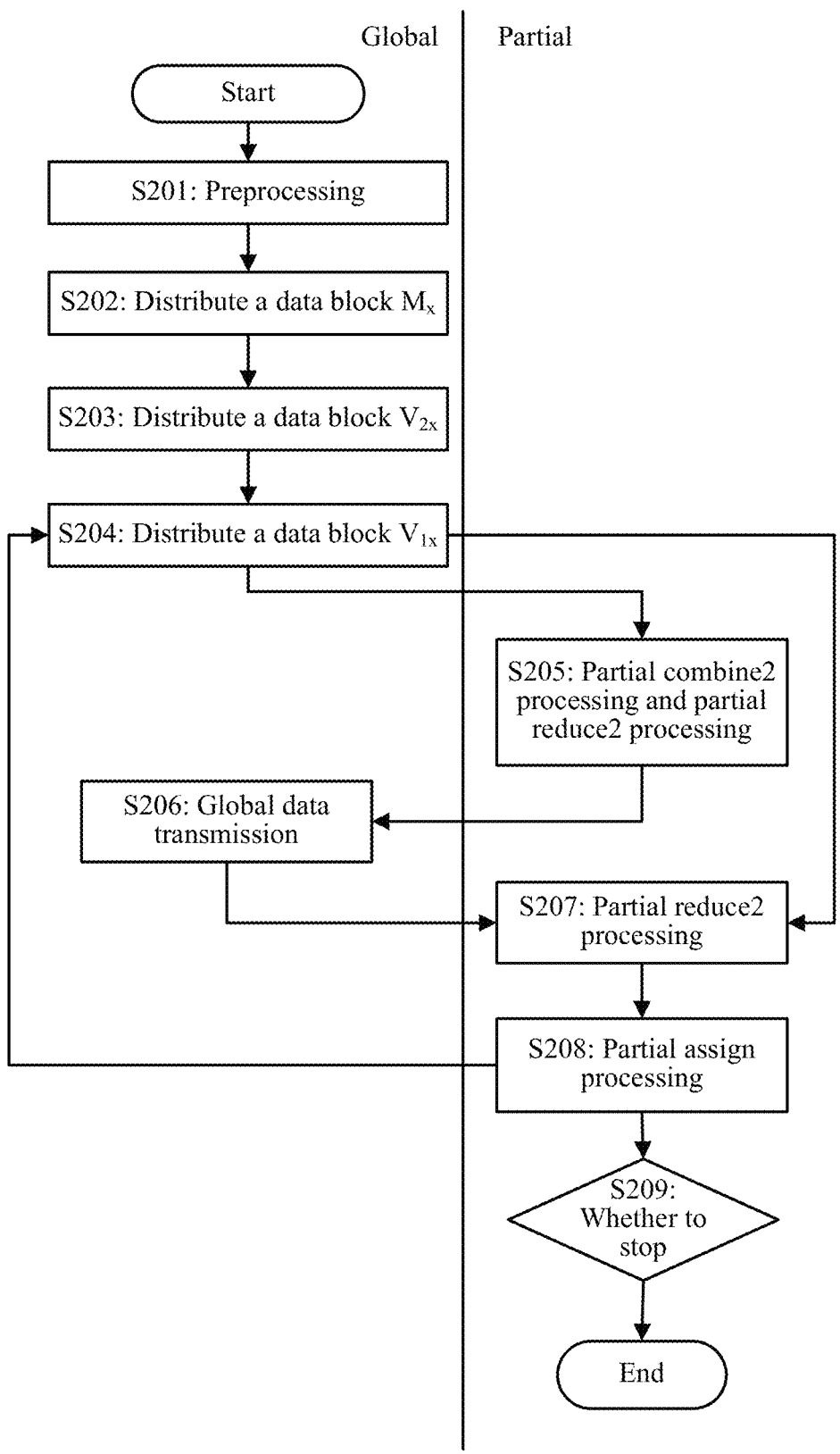
FIG. 9 is a flow diagram of performing data processing by a data processing system according to an embodiment of the present disclosure.

FIG. 9 is a schematic flowchart of performing data processing by a data processing system 100 according to an embodiment of the present disclosure. As shown in FIG. 9, data processing performed by the data processing system 100 includes the following steps:

S201: Perform preprocessing, and obtain a data block M', a data block $V_1'$, and a data block $V_2'$, where the data block M' is a matrix, and the data block $V_1'$ and the data block $V_2'$ are vectors.

S202: Perform matrix distribution, partition the matrix M', and distribute blocks of the matrix M' to at least two computing nodes of a cluster, where a data block $M_x$ is distributed to a computing node $FC_x$.

S203: Distribute the data block $V_2'$, partition the data block $V_2'$, and broadcast the partitioned data block $V_2'$.

S204: Distribute the data block $V_1'$, partition the data block $V_1'$, and broadcast the partitioned data block $V_1'$. The matrix and the vectors that are partitioned in S202 to S204 are correspondingly distributed to the at least two computing nodes, where the computing nodes are distributed.

S205: Each computing node performs partial combine2 processing and partial reduce2 processing. Combine2 processing is performed on a data block $M_x$ and a data block $V_{1x}$, and before all intermediate results corresponding to the data block $M_x$ and the data block $V_{1x}$ are obtained, reduce2 processing is performed on an intermediate result to obtain a first intermediate result. Then reduce2 processing is performed on the first intermediate result and a newly obtained intermediate result to obtain a new first intermediate result. A final first intermediate result is a result obtained after reduce2 processing is performed on all the intermediate results corresponding to the data block $M_x$ and the data block $V_{1x}$.

S206: Each computing node performs global data transmission on the final first intermediate results obtained in S205, so that the final first intermediate results are concentrated in one computing node. According to the method in this embodiment of the present disclosure, global data transmission is performed on data obtained after reduce processing. Therefore, relative to an existing matrix-vector multiplication operation, a volume of transmitted data is greatly reduced.

S207: Perform reduce2 processing on elements of first intermediate results corresponding to at least two matrix blocks at one horizontal location in the matrix M', to obtain an element of a second intermediate result. That is, reduce2 processing is performed on elements of first intermediate results in each row of multiple matrix blocks at one horizontal location, to obtain the element of the second intermediate result. Multiple elements of the second intermediate result form a second intermediate result $V''_y$.

S208: Perform assign processing on the elements of the second intermediate result $V''_y$ and corresponding elements in a data block $V_{2x}$, to obtain elements in a resultant vector and further obtain the resultant vector.

S209: Determine whether a termination condition is met; and if the termination condition is met, the process ends, or if the termination condition is not met, perform S204 to S209 using the resultant vector as a data block $V_1'$ for next iteration.

Figures 10, 11:
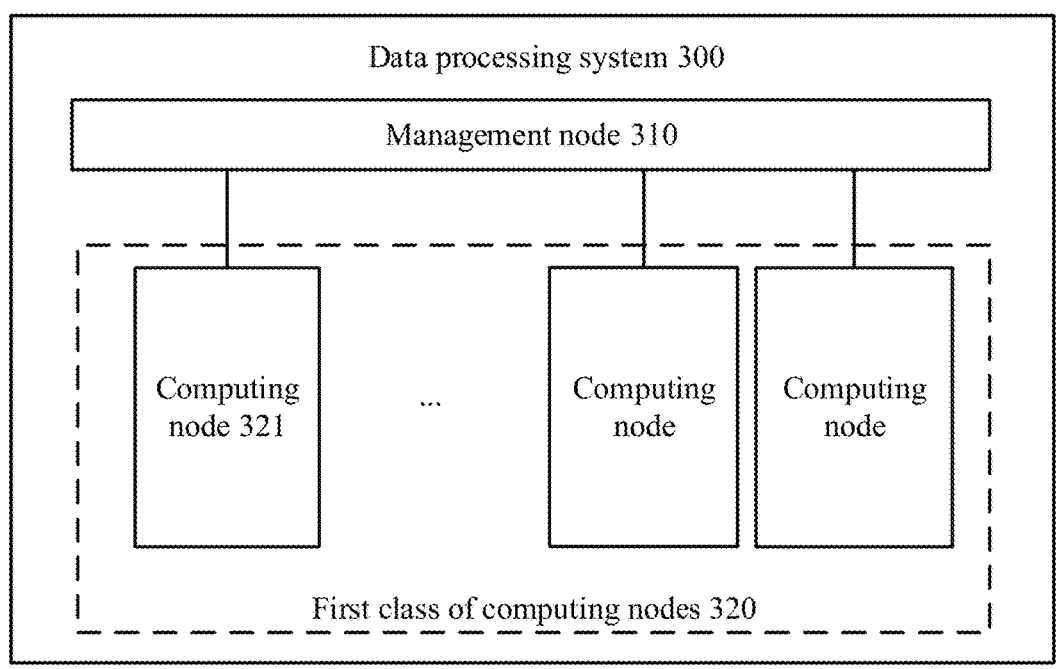
FIG. 10 is a schematic diagram of a single source shortest path (SSSP) algorithm according to an embodiment of the present disclosure.
FIG. 11 is a simplified block diagram of another data processing system according to an embodiment of the present disclosure.

The following describes this embodiment of the present disclosure using an example of resolving, using the SSSP algorithm described above, a problem about determining a shortest distance from a vertex 0 to other vertices. The matrix in the SSSP algorithm is a matrix obtained after transposition is performed on the adjacency matrix M in FIG. 6B, and both the vector $V_1$ and the vector $V_2$ are V in FIG. 7. As shown in FIG. 10, the matrix obtained after transposition is performed on the adjacency matrix M in FIG. 6B and the initial vector V are first partitioned. Then combine2 processing and reduce2 processing are performed on blocks of the matrix and corresponding blocks of V.

Herein, the reduce2 processing is performed before all first intermediate results are obtained through combine2 processing on the blocks of the matrix and the corresponding blocks of V, that is, the combine2 processing and the reduce2 processing are performed alternately. After the combine2 processing and the reduce2 processing are performed on the blocks, a first intermediate result corresponding to each matrix block can be obtained. An intermediate vector $\nabla$ can be obtained by performing reduce2 processing on first intermediate results corresponding to matrix blocks in one row. Assign processing is performed on the intermediate vector $\nabla$ and V to obtain a resultant vector. The combine2 processing is "addition" processing, and combine2($M_{i,j}$, $V_j$)=$M_{i,j}$+$V_j$; the reduce2 processing is "minimization" processing, and reduce2($x_1$, $x_2$)=min($x_1$, $x_2$); the assign processing is "minimization" processing, and assign($V_i$, $\nabla_i$)=min($V_i$, $\nabla_i$).

Therefore, according to the data processing method provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

FIG. 11 is a schematic block diagram of a data processing system 300 according to another embodiment of the present disclosure. As shown in FIG. 11, the data processing system 300 includes a management node 310 and a first class of computing nodes 320.

The management node 310 is configured to:

allocate first processing tasks to at least two computing nodes that include an $FC_x$ and that are in the first class of computing nodes 320, where the $FC_x$ is the $x^{th}$ computing node in the at least two computing nodes, and x is a positive integer.

The at least two computing nodes in the first class of computing nodes 320 concurrently process the first processing tasks allocated by the management node 310.

The computing node $FC_x$ is configured to: obtain, according to a first processing task allocated by the management node 310, a data block $M_{1x}$ and a data block $M_{2x}$ that are in a to-be-processed dataset, where the data block $M_{1x}$ is a matrix including m rows and n columns of data, the data block $M_{2x}$ is a matrix including n rows and p columns of data, m, n, and p are positive integers, and a value of n is not less than 2; and perform a combine2 operation and a reduce2 operation on the data block $M_{1x}$ and the data block $M_{2x}$, to obtain a first intermediate result $M'_x$, where the first intermediate result $M'_x$ is a matrix including m rows and p columns of data; and the first intermediate result $M'_x$ has an element $m'_{i,j}$, where i and j are variants, a value of i ranges from 1 to m, a value of j ranges from 1 to p, $m'_{i,j}$=$m'_{i,j,n}$, $m'_{i,j,n}$ is obtained according to $m'_{i,j,k}$=reduce2($m'_{i,j,k-1}$, combine2($m_{1[i,k]}$, $m_{2[k,j]}$)), $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n.

The management node 310 is further configured to obtain a processing result for the to-be-processed dataset according to first intermediate results obtained by the at least two computing nodes in the first class of computing nodes 320.

Therefore, according to the data processing system provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Specifically, the data processing system 300 provided by this embodiment of the present disclosure may be applied to big data processing. Because a volume of data for big data processing is relatively large, the data is usually partitioned, and different data blocks are distributed to different computing nodes for concurrent computation, so as to improve computation efficiency. The data processing system 300 includes the management node 310 and the first class of computing nodes 320. The management node 310 is configured to: receive a data processing task, partition the data processing task into multiple processing tasks, and deliver the processing tasks to computing nodes. The management node 310 is further configured to receive statuses of executing the processing tasks of the computing nodes by the computing nodes, so as to manage a data processing process. The computing nodes are configured to: receive the processing tasks delivered by the management node 310, and obtain data blocks according to the processing tasks, so as to execute the corresponding processing tasks. A computing node may obtain a data block stored in the computing node, to execute a processing task, or may obtain a data block stored in another computing node, to execute a processing task. Because classes of processing tasks are different, the computing nodes may be classified according to the classes of the processing tasks of the computing nodes. For example, a first class of nodes process first processing tasks, and a second class of nodes process second processing tasks.

In this embodiment of the present disclosure, the management node 310 is configured to allocate the first processing tasks to the at least two computing nodes that include the $FC_x$ 321 and that are in the first class of computing nodes 320, where the $FC_x$ 321 is the $x^{th}$ computing node in the at least two computing nodes, and x is a positive integer. The at least two computing nodes in the first class of computing nodes 320 concurrently process the first processing tasks allocated by the management node 310.

After receiving the first processing task allocated by the management node 310, the computing node $FC_x$ 321 obtains, according to the first processing task, the data block $M_{1x}$ and the data block $M_{2x}$ that are in the to-be-processed dataset, where the data block $M_{1x}$ is a matrix including m rows and n columns of data, the data block $M_{2x}$ is a matrix including n rows and p columns of data, m, n, and p are positive integers, and a value of n is not less than 2. Processing on the data block $M_{1x}$ and the data block $M_{2x}$ may be regarded as a matrix-matrix multiplication operation.

The computing node $FC_x$ 321 performs the combine2 operation and the reduce2 operation on the data block $M_{1x}$ and the data block $M_{2x}$, to obtain the first intermediate result $M'_x$, where the first intermediate result $M'_x$ is a matrix including m rows and p columns of data. The first intermediate result $M'_x$ has an element $m'_{i,j}$, where i and j are variants, a value of i ranges from 1 to m, a value of j ranges from 1 to p, $m'_{i,j} = m'_{i,j,n}$, $m'_{i,j,n}$ is obtained according to $m'_{i,j,k} = \text{reduce2}(m'_{i,j,k-1}, \text{combine2}(m_{1[i,k]}, m_{2[k,j]}))$, $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n.

Specifically, the combine operation is performed on an element in the $i^{th}$ row and the $k^{th}$ column of the data block $M_{1x}$ and an element in the $k^{th}$ row and the $j^{th}$ column of the data block $M_{2x}$, to obtain an intermediate result $x_{ikj}$ corresponding to the element in the $i^{th}$ row and the $k^{th}$ column of the data block $M_{1x}$ and the element in the $k^{th}$ row and the $j^{th}$ column of the data block $M_{2x}$. The combine operation herein may be the combine2 operation described above, and may be used in a formula to express the intermediate result: $x_{ikj} = \text{combine2}(m_{1[i,k]}, m_{2[k,j]})$.

Then, the reduce2 operation is performed on an intermediate result $x_{ikj}$ corresponding to the $i^{th}$ row of the data block $M_{1x}$ and the $j^{th}$ column of the data block $M_{2x}$, to obtain an element $m'_{i,j}$ corresponding to the $i^{th}$ row of the data block $M_x$ and the $j^{th}$ column of the data block $M_{2x}$, where the value of i ranges from 1 to m, and the value of j ranges from 1 to p; in this case, the first intermediate result $M'_x$ can be obtained. The combine2 operation and the reduce2 operation may be: first computing $x_{i1j}$ and $x_{i2j}$, and performing a reduce2 operation on $x_{i1j}$ and $x_{i2j}$; then computing $x_{i3j}$, and performing a reduce2 operation on $x_{i3j}$ and a result obtained after the reduce2 operation is performed on $x_{i1j}$ and $x_{i2j}$; . . . , until each element of the intermediate result $x_{ikj}$ corresponding to the $i^{th}$ row of the data block $M_{1x}$ and the $j^{th}$ column of the data block $M_{2x}$ has undergone a reduce2 operation. The reduce2 operations are not performed after all combine2 operations are completed, but the combine2 operations and the reduce2 operations are performed alternately. In this way, the intermediate result $x_{ikj}$ that has undergone the reduce2 operation in the computation process can be deleted, and there is no need to store results of all the combine2 operations in a memory; therefore, memory space can be reduced.

It should be understood that the foregoing process is in essence an update process. That is, a reduce2 operation is first performed to obtain an intermediate result obtained after the reduce2 operation is performed on two $x_{ikj}$, and then a reduce2 operation is performed on the obtained intermediate result and another $x_{ikj}$ or another intermediate result to obtain an intermediate result, so as to continuously update an intermediate result.

The reduce2 operation herein may be addition, subtraction, multiplication, division, maximization, minimization, or the like, which is not limited in this embodiment of the present disclosure. Herein, for processing, using the reduce2 operation, on intermediate results (for example, $x_{i1j}, \ldots, x_{inj}$) corresponding to elements in a row of a matrix, reduce2 processing is performed step by step in a process of computing an intermediate result $x_{ikj}$, instead of being performed after all of the $x_1, \ldots, x_n$ are computed.

It should be understood that an advantage of the reduce2 operation is: a sequence of elements on which reduce2 operations are performed does not need to be considered in a computation process, that is, an only result is obtained regardless of the sequence of the elements on which the reduce2 operations are performed. For example, in the Scala language, an array is it=Array(0,1,2,3,4,5), and elements in the array are summed, which may be expressed as it.reduce (_+_). During specific implementation of computation, a value obtained by adding data from left to right is the same as a final value obtained by performing pairwise reduce2 operation on the data. The foregoing description of performing the reduce2 operation on $x_{i3j}$ and the result obtained after the reduce2 operation is performed on $x_{i1j}$ and $x_{i2j}$ is only one implementation manner. An execution sequence of reduce2 operations is not limited to a sequence of $x_{i1j}, \ldots, x_{inj}$. A result the same as that obtained after sequential execution can be obtained by performing a reduce2 operation on any two of $x_{i1j}, \ldots, x_{imj}$ and then performing a reduce2 operation on an obtained result and another $x_{ikj}$. No limitation is imposed on a reduce2 operation sequence in this embodiment of the present disclosure.

The management node 310 is further configured to obtain the processing result for the to-be-processed dataset according to the first intermediate results obtained by the at least two computing nodes in the first class of computing nodes 320. After completing the first processing tasks, the first class of computing nodes 320 notify the management node 310. The management node 310 obtains the processing result for the to-be-processed dataset according to the first intermediate results obtained by the at least two computing nodes in the first class of computing nodes 320, or delivers, to a corresponding computing node using the first intermediate results as basic data for another processing task, the another processing task that is to be computed using the first intermediate results.

Therefore, according to the data processing system provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Optionally, in an embodiment, the data processing system 300 further includes a second class of computing nodes, and the management node 310 is further configured to:

allocate, according to the first intermediate results obtained by the at least two computing nodes in the first class of computing nodes 320, a second processing task to at least one computing node that includes an $SC_y$ and that is in the second class of computing nodes, where the $SC_y$ is the $y^{th}$ computing node in the at least one computing node, and y is a positive integer.

The computing node $SC_y$ is configured to:

obtain, according to a second processing task, the first intermediate results obtained by the at least two computing nodes in the first class of computing nodes 320, where the first intermediate results obtained by the $SC_y$ are first intermediate results obtained according to data blocks $M_{1x}$ in one row and data blocks $M_{2x}$ in one column that are in the to-be-processed dataset; and perform a reduce2 operation on the first intermediate results obtained by the $SC_y$, to obtain a second intermediate result $M''_y$, where the second intermediate result $M''_y$ is a matrix including m rows and p columns of data.

The management node 310 is configured to:

obtain a processing result for the to-be-processed dataset according to a second intermediate result obtained by the at least one computing node in the second class of computing nodes.

Specifically, after the foregoing processing is completed, other processing may be further performed on the first intermediate results obtained by the first class of computing nodes 320. For example, when the data blocks $M_{1x}$ processed by the at least two computing nodes in the first class of computing nodes 320 are data blocks in one row in the to-be-processed dataset and the data blocks $M_{2x}$ are data blocks in one column in the to-be-processed dataset, the management node 310 may allocate, according to the first intermediate results obtained by the at least two computing nodes in the first class of computing nodes 320, the second processing task to the at least one computing node that includes the $SC_y$ and that is in the second class of computing nodes, where the $SC_y$ is the $y^{th}$ computing node in the at least one computing node, and y is a positive integer.

The computing node $SC_y$ is configured to obtain, according to a second processing task, the first intermediate results obtained by the at least two computing nodes in the first class of computing nodes 320, where the first intermediate results obtained by the $SC_y$ are first intermediate results obtained according to data blocks $M_{1x}$ and data blocks $M_{2x}$, where the data blocks $M_{1x}$ are data blocks in one row in the to-be-processed dataset, and the data blocks $M_{2x}$ are data blocks in one column in the to-be-processed dataset. The second processing task is performing a reduce2 operation on the first intermediate results obtained by the $SC_y$, to obtain the second intermediate result $M''_y$, where the second intermediate result $M''_y$ is a matrix including m rows and p columns of data. The reduce2 operation performed on the first intermediate results obtained by the $SC_y$ is similar to the reduce2 operation described above. That is, a reduce2 operation is first performed on two first intermediate results obtained using data blocks $M_{1x}$ and data blocks $M_{2x}$, and then a reduce2 operation is performed on a result of the foregoing reduce2 operation and another first intermediate result, where the data blocks $M_{1x}$ are data blocks in one row in the to-be-processed dataset, and the data blocks $M_{2x}$ are data blocks in one column in the to-be-processed dataset.

The management node 310 is specifically configured to obtain the processing result for the to-be-processed dataset according to the second intermediate result obtained by the at least one computing node in the second class of computing nodes.

Optionally, in an embodiment, the dataset further includes a data block $M_{3x}$, and the data block $M_{3x}$ is a matrix including m rows and p columns of data. The management node 310 is further configured to:

allocate, according to the second intermediate result obtained by the at least one computing node that includes the $SC_y$ and that is in the second class of computing nodes, a third processing task to the at least one computing node that includes the $SC_y$ and that is in the second class of computing nodes.

The computing node $SC_y$ is further configured to:

obtain the data block $M_{3x}$ in the dataset according to the third processing task; and perform an assign operation on the second intermediate result $M''_y$ and the data block $M_{3x}$ that are obtained by the $SC_y$, to obtain a processing result for the to-be-processed dataset.

Specifically, after a reduce2 operation is performed on first intermediate results obtained using data blocks in one row of the $M_{1x}$ and data blocks in one column of the $M_{2x}$ that are in the to-be-processed dataset, an assign operation may be further performed on an obtained second intermediate result, so as to obtain the processing result for the to-be-processed dataset. Both the second intermediate result $M''_y$ and the data block $M_{3x}$ are matrices including m rows and p columns of data. A resultant matrix may be obtained by performing an assign operation on corresponding elements, where the resultant matrix is a matrix including m rows and p columns of data. The assign processing herein may be the assign processing described above.

The foregoing is a matrix-matrix multiplication operation process. In conclusion, the matrix-matrix multiplication operation in this embodiment of the present disclosure may be expressed as the following formula 6:

$A \otimes B \oplus C = D$ (formula 6)

Optionally, in an embodiment, the second class of computing nodes in the data processing system 300 are further configured to perform row processing on the $r^{th}$ row of the processing result for the to-be-processed dataset, where the row processing is processing on elements in the $r^{th}$ row.

Specifically, a resultant matrix D may be further processed. For example, reduce processing may be performed on elements in the $r^{th}$ row of the resultant matrix D, which may be expressed using a formula reduceRow($D_{i1}, \ldots, D_{in}$), where the reduceRow processing may be maximization, minimization, selection of Q greatest values, selection of Q smallest values, summation of data in the row, or the like, which is not limited in this embodiment of the present disclosure. A result obtained after the reduceRow processing may be stored still in a corresponding matrix form. For example, the $i^{th}$ row of the resultant matrix D is maximized, and a maximum value is $D_{i1}$; in this case, the numerical value $D_{i1}$ is stored in the $i^{th}$ row and the $1^{st}$ column of a stored matrix, and a numerical value 0 is stored in other columns (or 0 is not stored). When the result obtained after the reduceRow processing is stored, only a numerical value obtained after the processing may be stored. For example, the summation processing is performed on the $i^{th}$ row of the resultant matrix D, and a result of the summation is Y; in this case, the numerical value Y is stored. No limitation is imposed on a storage manner in this embodiment of the present disclosure.

Similarly, in an embodiment, the second class of computing nodes in the data processing system 300 are further configured to perform column processing on the $c^{th}$ column of the processing result for the to-be-processed dataset, where the column processing is processing on elements in the $c^{th}$ column. To avoid repetition, no details are further repeated in this specification.

Optionally, in an embodiment, n=p, and the data block $M_{1x}$ and the data block $M_{3x}$ are a same data block. It should be understood that, for example, the data block $M_{1x}$ is a matrix with 3 rows and 4 columns, the data block $M_{2x}$ is a matrix with 4 rows and 4 columns, combine processing is performed on the data block $M_{1x}$ and the data block $M_{2x}$ to obtain a matrix with 3 rows and 4 columns, and assign processing is performed on the matrix with 3 rows and 4 columns and the data block $M_{3x}$ to obtain a resultant matrix; therefore, the data block $M_{1x}$ and the data block $M_{3x}$ may be a same data block.

Optionally, in an embodiment, n=m, and the data block $M_{2x}$ and the data block $M_{3x}$ are a same data block. It should be understood that in this embodiment of the present disclosure, an operation such as transposition may be performed on at least one of the data block $M_{1x}$, the data block $M_{2x}$, or the data block $M_{3x}$ used for computation, so as to meet a computation requirement. Therefore, the data block $M_{2x}$ and the data block $M_{3x}$ are a same data block.

Optionally, in an embodiment, when the second class of computing nodes include at least two computing nodes, the at least two computing nodes in the second class of computing nodes concurrently process second processing tasks allocated by the management node.

Optionally, in an embodiment, the management node, the first class of computing nodes, and the second class of computing nodes each may be a physical machine, a virtual machine, or a central processing unit (CPU).

The following describes in detail this embodiment of the present disclosure with reference to a specific example.

Figure 12:
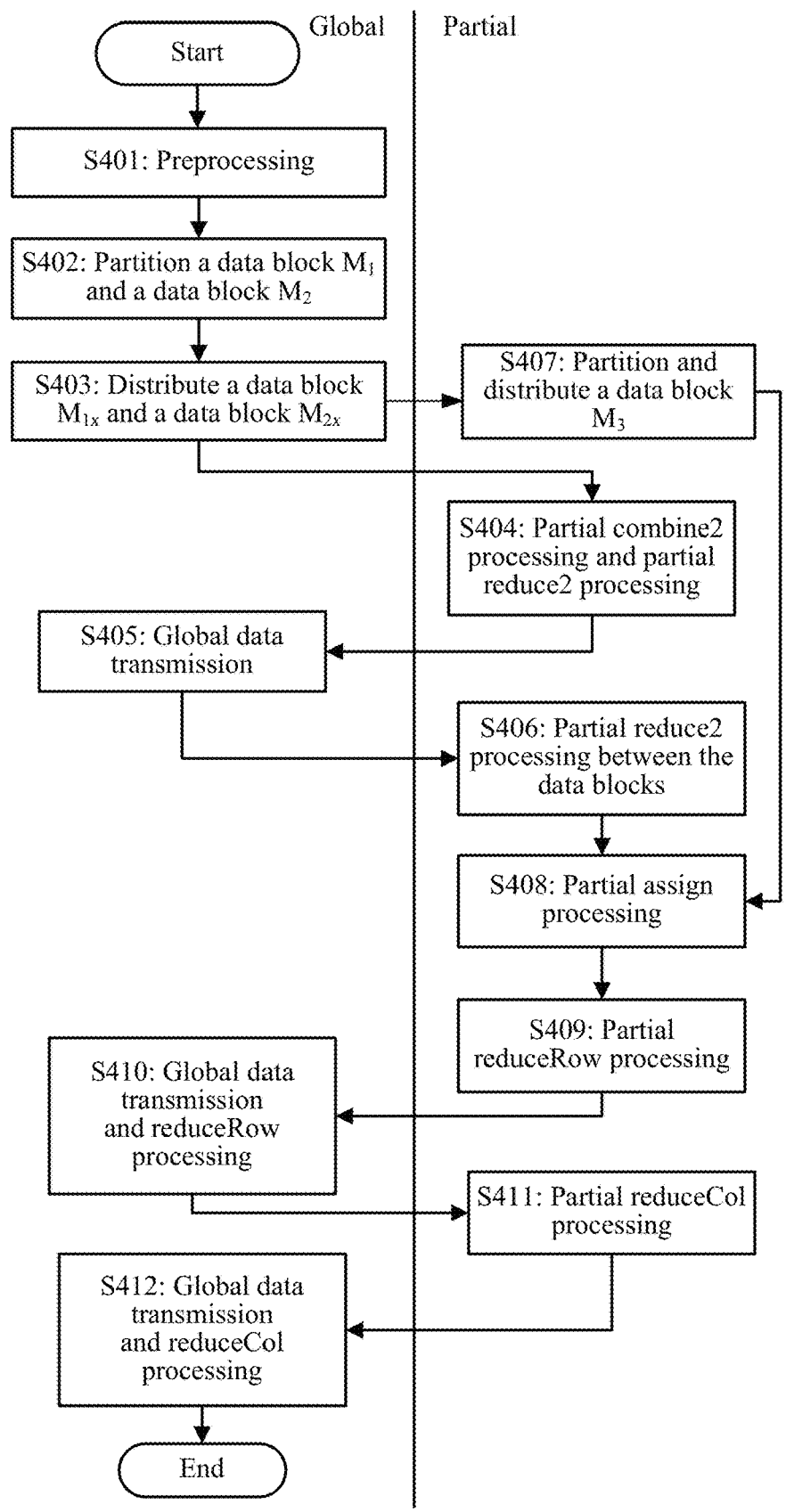
FIG. 12 is a flow diagram of performing data processing by another data processing system according to an embodiment of the present disclosure.

FIG. 12 is a schematic flowchart of a method 400 for performing data processing by a data processing system 300 according to an embodiment of the present disclosure. As shown in FIG. 12, the method 400 includes the following steps:

S401: Perform preprocessing, and obtain a data block $M_1$, a data block $M_2$, and a data block $M_3$, where all of the data block $M_1$, the data block $M_2$, and the data block $M_3$ are matrices.

S402: Perform matrix partitioning, and partition the data block $M_1$ and the data block $M_2$, where the data block $M_1$ is partitioned into multiple data blocks $M_{1x}$, and the data blocks $M_{1x}$ are matrices including m rows and n columns of data; the data block $M_2$ is partitioned into multiple data blocks $M_{2x}$, and the data blocks $M_{2x}$ are matrices including n rows and p columns of data.

S403: Perform matrix distribution, distribute the data blocks $M_{1x}$ to at least one computing node by row, and correspondingly, distribute the data blocks $M_{2x}$ to the at least one computing node by column.

S404: Each of a first class of computing nodes performs partial combine2 processing and partial reduce2 processing. Combine2 processing is performed on a data block $M_{1x}$ and a data block $M_{2x}$, and before all intermediate results corresponding to a row of the data block $M_{1x}$ and a corresponding column of the data block $M_{2x}$ are obtained, reduce2 processing is performed on an intermediate result to obtain a first intermediate result. Then reduce2 processing is performed on the first intermediate result and a newly obtained intermediate result to obtain a new first intermediate result. A final first intermediate result is a result obtained after reduce2 processing is performed on all the intermediate results corresponding to the row of the data blocks $M_{1x}$ and the corresponding column of the data blocks $M_{2x}$. Further, by analogy, final first intermediate results corresponding to all combinations of a row of the data block $M_{1x}$ and a column of the data block $M_{2x}$ are obtained, where the final first intermediate results can form a matrix.

S405: Each of the first class of computing nodes performs global data transmission on the final first intermediate results obtained in S404, so that the final first intermediate results are concentrated in one of a second class of computing nodes. According to the method in this embodiment of the present disclosure, global data transmission is performed on data obtained after reduce processing; therefore, a volume of transmitted data is relatively small.

S406: Perform reduce2 processing on first intermediate results corresponding to at least two data blocks that are corresponding to a row of the data block $M_1$ and a column of the data block $M_2$, to obtain a second intermediate result. Multiple second intermediate results form an intermediate matrix X; the intermediate matrix X is partitioned and is distributed to at least one computing node.

S407: Partition and distribute the data block $M_3$, distribute data blocks $M_{3x}$ of the data block $M_3$ to computing nodes on which matrix blocks of the intermediate matrix X are located, where the data blocks $M_{3x}$ are matrices including m rows and p columns of data.

S408: Perform assign processing on elements in the matrix blocks of the intermediate matrix X and corresponding elements in the data blocks $M_{3x}$, to obtain elements in matrix blocks of a resultant matrix D and further obtain the matrix blocks of the resultant matrix D.

S409: Perform reduceRow processing on each matrix block of the resultant matrix D by row.

S410: Perform data transmission, to transmit each result obtained in S409; and then perform reduceRow processing on results corresponding to matrix blocks in one row, to obtain a matrix Y.

S411: Perform reduceCol processing on each matrix block of the matrix Y by column.

S412: Perform data transmission, to transmit each result obtained in S411; and then perform reduceCol processing on results corresponding to matrix blocks in one column, to obtain a matrix Z.

Therefore, according to the data processing method provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Probability propagation is one of recommended algorithms. A "user-project" interaction record database needs to recommend, to each user, several projects in which the user may be interested. The probability propagation is based on global data, and can be used to compute, at a time, all projects potentially interested by users. The algorithm has a solid theoretical foundation: The probability propagation is evolved from "law of conservation of energy" in physics. An operation of a matrix is similar to energy propagation between different substances, and for a finally obtained interest degree matrix and an original matrix, sums of elements in corresponding rows are absolutely equal, and sums of elements in corresponding columns are also absolutely equal, which manifests conservation of energy.

A probability propagation algorithm may be implemented using an operation on a matrix. In implementation of an existing probability propagation algorithm using a matrix, a matrix of "degrees of attraction to users by films " and a matrix of "interest similarities between users" can be obtained; then a matrix-matrix multiplication operation is performed to obtain a matrix of "new degrees of attraction to users by films"; next, films that have been watched by the users are screened out; and finally, only top k films that have not been watched are recommended to each user. According to the probability propagation algorithm, only several films are provided for each user, a relatively sparse resultant matrix (there are relatively many zero elements) is obtained, and generally, a data volume is relatively small (in such scenario, the zero elements do not need to be stored). However, in an existing solution, a very dense matrix of "new degrees of attraction to users by films" is usually obtained in a computation process, and a data volume is very large. This results in a large amount of occupied intermediate memory and a large amount of data transmitted by a system.

In the probability propagation algorithm implemented using the matrix-matrix multiplication operation in the embodiments of the present disclosure, there are m films and n users in an original dataset, and top k films are recommended to each user. A first matrix A is a matrix of "degrees of attraction to users by films " with m rows and n columns, a second matrix B is a matrix of "interest similarities between users" with n rows and n columns, and a third matrix C used in an assign processing and the first matrix A are a same matrix. In this case, a formula for recommending, to each user, top k films that have not been watched is:

$$A \otimes B \oplus C = D \quad \text{(formula 7)}$$

A specific computation process is as follows: first performing combine2 processing and reduce2 processing on elements in the first matrix A and elements in the second matrix B. Herein, the reduce2 processing is performed before all intermediate results are obtained through the combine2 processing on the elements in the first matrix A and the elements in the second matrix B, that is, the combine2 processing and the reduce2 processing are performed alternately. After the combine2 processing and the reduce2 processing are performed on the elements in the first matrix A and the elements in the second matrix B, a first intermediate result corresponding to the first matrix A and the second matrix B can be obtained. Assign processing is performed on the first intermediate result and the third matrix C that is used in the assign processing, to obtain a resultant matrix D. Finally, reduceCol processing is performed on columns of the resultant matrix D.

The combine2 processing is "multiplication" processing, and combine2($A_{ij}$, $B_{jk}$)=$A_{ij}$*$B_{jk}$. The reduce2 processing is "addition" processing, and $x_{ik}$=reduce2($x_{i1k}$, $x_{i2k}$)=$x_{i2k}$. The assign processing is "screening" processing, and $$D_{ik} = \text{assign}(x_{ik}, C_{ik}) = \begin{cases} \text{if}(C_{ik} == 0) & D_{ik} = x_{ik} \\ \text{if}(C_{ik} \neq 0) & D_{ik} = 0 \end{cases}.$$

That is, if an element at a corresponding location in the third matrix C on which the assign processing is performed is nonzero, the element is screened out (the element is set to 0). In other words, if a user does not watch film, the data is reserved, or if the user has watched film, the data is screened out (the element is set to 0), so as to execute reduceCol processing. The reduceCol processing is "top k evaluation" processing, and reduceCol($D_{1j}$, . . . , $D_{mj}$)=($D_{1j}$, . . . , $D_{mj}$).topk, that is, k greatest values in the $j^{th}$ column are evaluated, where k in this example is 1.

Figure 13:
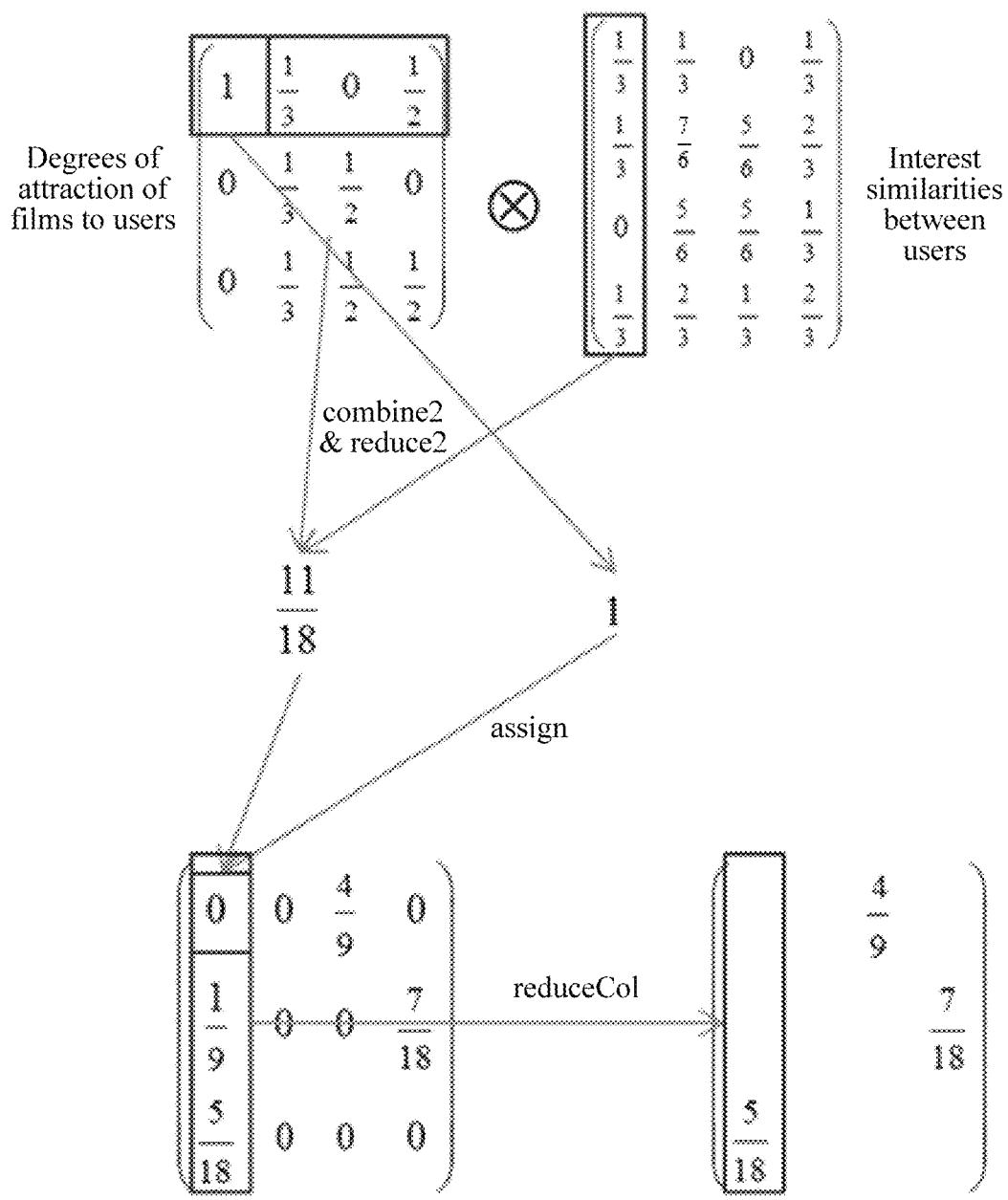
FIG. 13 is a schematic diagram of executing a probability propagation algorithm by another data processing system according to an embodiment of the present disclosure.

FIG. 13 is a main flowchart of a probability propagation algorithm implemented using the matrix-matrix multiplication operation in the embodiments of the present disclosure. First, combine2 processing and reduce2 processing are performed on one row of the first matrix A and one column of the second matrix B to obtain a value 11/18. Then, because a value at a corresponding location in the third matrix C used in the assign processing is 1, the assign processing is performed to obtain that a value of a corresponding element in the resultant matrix D is 0 (if the system does not store a zero element, corresponding combine2 processing and reduce2 processing may not be performed for computation). Finally, top k evaluation processing is performed on obtained elements in one column, to obtain films whose degree of attraction is top k and that has not been watched by a user.

According to the matrix-matrix multiplication operation in the embodiments of the present disclosure, in a process of computing a matrix of "new degrees of attraction of films to users" using the probability propagation algorithm, films that have been watched can be screened out (even computation on records that need to be screened out can be directly omitted), and films that ranked top k according to scores from users are recommended, so that intermediate memory occupancy and a volume of data transmitted by the system are reduced.

It should be understood that in the process of the matrix-vector multiplication operation and the matrix-matrix multiplication operation in the embodiments of the present disclosure, isCompute operators can be introduced to determine whether computation needs to be performed on the row. If the computation is not required, the row is skipped, and a next row continues to be computed. If the computation is required, a combine2 operation and a reduce2 operation are performed according to the algorithm. Usually, the isCompute operator in the matrix-vector multiplication operation may be a column vector whose quantity of elements is equal to a quantity of rows of a data block $M_x$, and the isCompute operator in the matrix-matrix multiplication operation may be a matrix, which is not limited in the embodiments of the present disclosure.

The following describes performance of the matrix-vector multiplication operation and performance of the matrix-matrix multiplication operation in the embodiments of the present disclosure.

In a general concurrent computation framework spark, performance of an extended GIMV model in the prior art is compared with that of the matrix-vector multiplication operation in the embodiments of the present disclosure. A test environment is a cluster including three machines (three RH2285, 12 cores, 24 threads, 192G memory, 100G configuration). Data in a wiki_talk dataset is tested, and a test result indicates that, a computation time for the extended GIMV model in the prior art exceeds 3600s while the matrix-vector multiplication operation in the embodiments of the present disclosure requires 340s.

Similarly, in the spark, the performance of the matrix-matrix multiplication operation in the embodiments of the present disclosure is compared with performance of an operation of implementing "seeking a recommended film" in the prior art. Table 1 shows sizes of tested datasets and test results. Data in the interactive Internet Protocol television (IPTV) dataset and the Nasdaq NFLX (NETFLIX™) dataset is tested. It can be seen from the test results that according to the embodiments of the present disclosure, intermediate memory occupancy can be effectively reduced, and a computation time can be shortened; therefore, a larger dataset can be processed.

$M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i = v'_{i,n}$, $v'_{i,n}$ is obtained according to $v'_{i,j} = \text{reduce2}(v'_{i,j-1}, \text{combine2}(m_{i,j}, v_j))$, $m_{i,j}$ is an element in the data block $M_x$, $v_j$ is an element in the data block $V_{1x}$, j is a variant, and a value of j ranges from 1 to n.

Optionally, in an embodiment, the computing node is a physical machine, a virtual machine, or a central processing unit (CPU), which is not limited in this embodiment of the present disclosure.

Therefore, according to the computing node provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Figure 15:
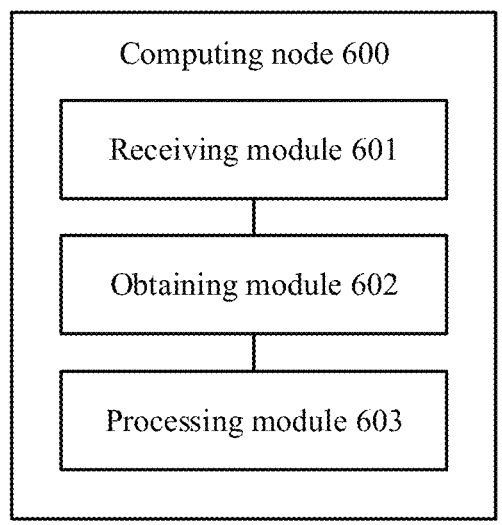
FIG. 15 is a block diagram of another computing node according to an embodiment of the present disclosure.

FIG. 15 shows a computing node 600 according to an embodiment of the present disclosure. The computing node 600 belongs to a data processing system. The data processing system further includes a management node. The computing node includes:

a receiving module 601, configured to receive a first processing task allocated by the management node;

an obtaining module 602, configured to obtain, according to the first processing task allocated by the management node and received by the receiving module 601, a data block $M_{1x}$ and a data block $M_{2x}$ that are in a to-be-processed dataset, where the data block $M_{1x}$ is a matrix including m rows and n columns of data, the data block $M_{2x}$ is a matrix

TABLE 1

| Dataset | Quantity of users | Quantity of films | Quantity of records | Computation time (s) in the prior art | Computation time (s) in the embodiments of the present disclosure |
|---|---|---|---|---|---|
| IPTV | 92,995 | 8,593 | 3,383,327 | 364.421 | 153.917 |
| NETFLIX | 480,189 | 17,770 | 100,480,507 | Unobtainable | 897.577 |

Figure 14:
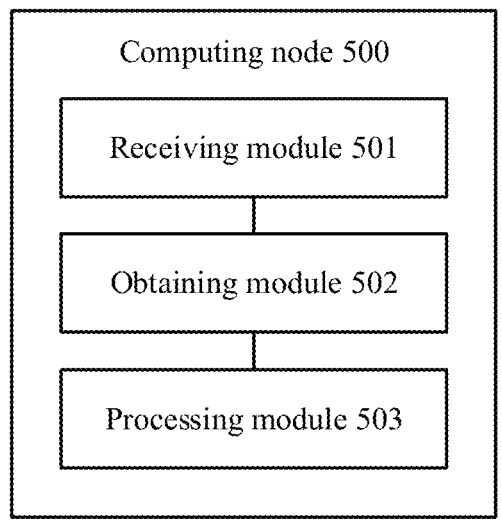
FIG. 14 is a block diagram of a computing node according to an embodiment of the present disclosure.
Figure 17:
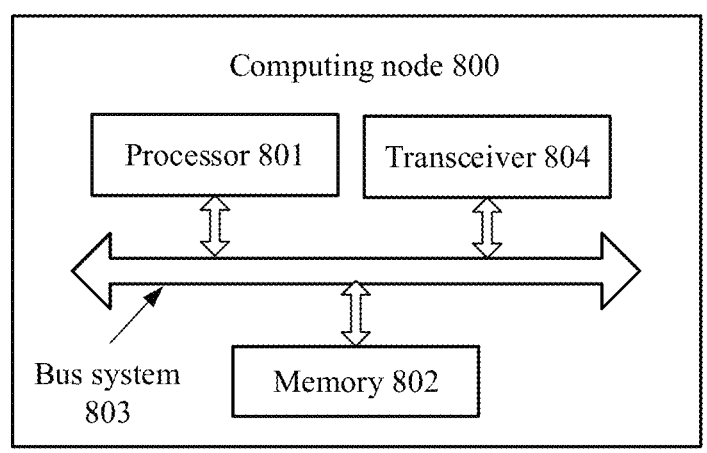
FIG. 17 is a block diagram of another computing node according to an embodiment of the present disclosure.

With reference to FIG. 1 to FIG. 13, the foregoing describes in detail the data processing system according to the embodiments of the present disclosure. With reference to FIG. 14 and FIG. 17, the following describes in detail a computing node in a data processing system according to embodiments of the present disclosure.

FIG. 14 shows a computing node 500 according to an embodiment of the present disclosure. The computing node 500 belongs to a data processing system. The data processing system further includes a management node. The computing node 500 includes:

a receiving module 501, configured to receive a first processing task allocated by the management node;

an obtaining module 502, configured to obtain, according to the first processing task allocated by the management node and received by the receiving module 501, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2; and a processing module 503, configured to perform a combine2 operation and a reduce2 operation on the data block including n rows and p columns of data, m, n, and p are positive integers, and a value of n is not less than 2; and a processing module 603, configured to perform a combine2 operation and a reduce2 operation on the data block $M_{1x}$ and the data block $M_{2x}$, to obtain a first intermediate result $M'_x$, where the first intermediate result $M'_x$ is a matrix including m rows and p columns of data; and the first intermediate result $M'_x$ has an element $m'_{i,j}$, where i and j are variants, a value of i ranges from 1 to m, a value of j ranges from 1 to p, $m'_{i,j} = m'_{i,j,n}$, $m'_{i,j,n}$ is obtained according to $m'_{i,j,k} = \text{reduce2}(m'_{i,j,k-1}, \text{combine2}(m_{1[i,k]}, m_{2[k,j]}))$, $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n.

Optionally, in an embodiment, the computing node is a physical machine, a virtual machine, or a central processing unit (CPU), which is not limited in this embodiment of the present disclosure.

Therefore, according to the computing node provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Figure 16:
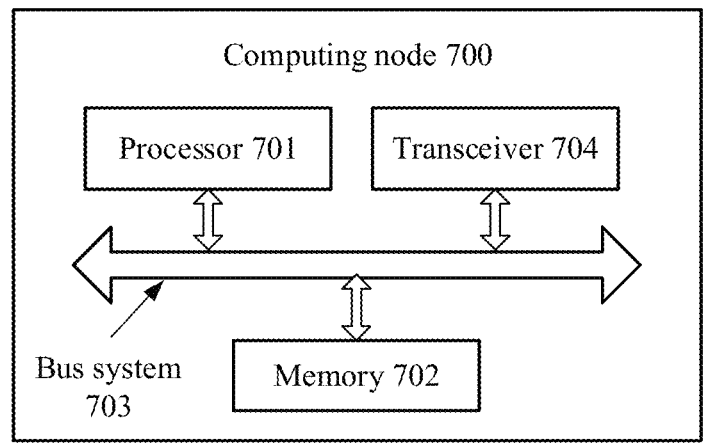
FIG. 16 is a block diagram of another computing node according to an embodiment of the present disclosure.

As shown in FIG. 16, an embodiment of the present disclosure further provides a computing node 700. The computing node 700 includes a processor 701, a memory 702, a bus system 703, and a transceiver 704. The processor 701, the memory 702, and the transceiver 704 are connected using the bus system 703. The memory 702 is configured to store an instruction. The processor 701 is configured to execute the instruction stored by the memory 702. The transceiver 704 is configured to:

receive a first processing task allocated by a management node; and obtain, according to the first processing task allocated by the management node, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2.

The processor 701 is configured to:

perform a combine (for example, combine2) operation and a reduce (for example, reduce2) operation on the data block $M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i=v'_{i,n}$, $v'_{i,n}$ is obtained according to $v'_{i,j}=$reduce2($v'_{i,j-1}$, combine2($m_{i,j}$, $v_j$)), $m_{i,j}$ is an element in the data block $M_x$, $v_j$ is an element in the data block $V_{1x}$, j is a variant, and a value of j ranges from 1 to n.

Therefore, according to the computing node provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

It should be understood that in this embodiment of the present disclosure, the processor 701 may be a central processing unit (CPU). The processor 701 may alternatively be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 702 may include a read-only memory and a random access memory and provide an instruction and data for the processor 701. A part of the memory 702 may further include a non-volatile random access memory. For example, the memory 702 may further store information about a device type.

In addition to including a data bus, the bus system 703 may further include a power bus, a control bus, a status signal bus, or the like. However, for clear description, all kinds of buses are marked as the bus system 703 in the figure.

In an implementation process, all steps of the foregoing method may be completed using an integrated logic circuit of hardware in the processor 701 or using an instruction in a software form. The steps of the method that is disclosed with reference to this embodiment of the present disclosure may be executed and completed by a hardware processor, or may be executed and completed using a combination of hardware and software modules in the processor. The software module may be located in a storage medium mature in the art such as a random access memory, a flash memory, a read-only memory, a programmable read-only memory, an electrically erasable programmable memory, or a register. The storage medium is located in the memory 702. The processor 701 reads the information in the memory 702, and completes the steps of the foregoing method with reference to hardware of the processor 701. To avoid repetition, no details are further repeated herein.

Optionally, in an embodiment, the computing node 700 is a physical machine, a virtual machine, or a central processing unit (CPU).

It should be understood that the computing node 700 in this embodiment of the present disclosure may correspond to an entity for executing the method in the foregoing embodiment of the present disclosure, or may correspond to the computing node 500 in the foregoing embodiment of the present disclosure. In addition, the foregoing or other operations and/or functions of the modules of the computing node 700 are to implement corresponding procedures of the data processing method. For conciseness, no details are further repeated herein.

Therefore, according to the computing node provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

As shown in FIG. 17, an embodiment of the present disclosure further provides a computing node 800. The computing node 800 includes a processor 801, a memory 802, a bus system 803, and a transceiver 804. The processor 801, the memory 802, and the transceiver 804 are connected using the bus system 803. The memory 802 is configured to store an instruction. The processor 801 is configured to execute the instruction stored by the memory 802. The transceiver 804 is configured to:

receive a first processing task allocated by a management node; and obtain, according to the first processing task allocated by the management node, a data block $M_{1x}$ and a data block $M_{2x}$ that are in a to-be-processed dataset, where the data block $M_{1x}$ is a matrix including m rows and n columns of data, the data block $M_{2x}$ is a matrix including n rows and p columns of data, m, n, and p are positive integers, and a value of n is not less than 2.

The processor 801 is configured to:

perform a combine2 operation and a reduce2 operation on the data block $M_{1x}$ and the data block $M_{2x}$, to obtain a first intermediate result $M'_x$, where the first intermediate result $M'_x$ is a matrix including m rows and p columns of data; and the first intermediate result $M'_x$ has an element $m'_{i,j}$, where i and j are variants, a value of i ranges from 1 to m, a value of j ranges from 1 to p, $m'_{i,j}=m'_{i,j,n}$, $m'_{i,j,n}$ is obtained according to $m'_{i,j,k}=$reduce2($m'_{i,j,k-1}$, combine2($m_{1[i,k]}$, $m_{2[k,j]}$)), $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n.

Therefore, according to the computing node provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

It should be understood that in this embodiment of the present disclosure, the processor 801 may be a central processing unit (CPU). The processor 801 may alternatively be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 802 may include a read-only memory and a random access memory and provide an instruction and data for the processor 801. A part of the memory 802 may further include a non-volatile random access memory. For example, the memory 802 may further store information about a device type.

In addition to including a data bus, the bus system 803 may further include a power bus, a control bus, a status signal bus, or the like. However, for clear description, all kinds of buses are marked as the bus system 803 in the figure.

In an implementation process, all steps of the foregoing method may be completed using an integrated logic circuit of hardware in the processor 801 or using an instruction in a software form. The steps of the method that is disclosed with reference to this embodiment of the present disclosure may be executed and completed by a hardware processor, or may be executed and completed using a combination of hardware and software modules in the processor. The software module may be located in a storage medium mature in the art such as a random access memory, a flash memory, a read-only memory, a programmable read-only memory, an electrically erasable programmable memory, or a register. The storage medium is located in the memory 802. The processor 801 reads the information in the memory 802, and completes the steps of the foregoing method with reference to hardware of the processor 801. To avoid repetition, no details are further repeated herein.

Optionally, in an embodiment, the computing node 800 is a physical machine, a virtual machine, or a central processing unit (CPU).

It should be understood that the computing node 800 in this embodiment of the present disclosure may correspond to an entity for executing the method in the foregoing embodiment of the present disclosure, or may correspond to the computing node 600 in the foregoing embodiment of the present disclosure. In addition, the foregoing or other operations and/or functions of the modules of the computing node 800 are to implement corresponding procedures of the data processing method. For conciseness, no details are further repeated herein.

Therefore, according to the computing node provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

With reference to FIG. 1 to FIG. 17, the foregoing describes in detail the data processing system and the computing node according to the embodiments of the present disclosure. With reference to FIG. 18 and FIG. 19, the following describes in detail a data processing method according to embodiments of the present disclosure.

FIG. 18 shows a data processing method 900 according to an embodiment of the present disclosure. The method 900 is applied to a data processing system. The data processing system includes a management node and a first class of computing nodes. The method 900 includes:

S901: The management node allocates first processing tasks to at least two computing nodes that include an $FC_x$ and that are in the first class of computing nodes, where the $FC_x$ is the $x^{th}$ computing node in the at least two computing nodes, and x is a positive integer; and the at least two computing nodes in the first class of computing nodes concurrently process the first processing tasks allocated by the management node.

S902: The computing node $FC_x$ obtains, according to a first processing task allocated by the management node, a data block $M_x$ and a data block $V_{1x}$ that are in a to-be-processed dataset, where the data block $M_x$ is a matrix including m rows and n columns of data, the data block $V_{1x}$ is a vector including n-dimensional data, m and n are positive integers, and a value of n is not less than 2.

S903: The computing node $FC_x$ performs a combine2 operation and a reduce2 operation on the data block $M_x$ and the data block $V_{1x}$, to obtain a first intermediate result $V'_x$, where the first intermediate result $V'_x$ is a vector including m-dimensional data; and the first intermediate result $V'_x$ has an element $v'_i$, where i is a variant, a value of i ranges from 1 to m, $v'_i = v'_{i,n}$, $v'_{i,j}$ is obtained according to $v'_{i,j}$=reduce2 $(v'_{i,j-1}, combine2(m_{i,j}, v_j))$, $m_{i,j}$ is an element in the data block $M_x$, $v_j$ is an element in the data block $V_{1x}$, j is a variant, and a value of j ranges from 1 to n.

S904: The management node obtains a processing result for the to-be-processed dataset according to first intermediate results obtained by the at least two computing nodes in the first class of computing nodes.

Therefore, according to the data processing method provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Optionally, in an embodiment, the data processing system further includes a second class of computing nodes. The method 900 further includes:

allocating, by the management node according to the first intermediate results obtained by the at least two computing nodes in the first class of computing nodes, a second processing task to at least one computing node that includes an $SC_y$ and that is in the second class of computing nodes, where the $SC_y$ is the $y^{th}$ computing node in the at least one computing node, and y is a positive integer;

obtaining, by the computing node $SC_y$ according to the second processing task, the first intermediate results obtained by the at least two computing nodes in the first class of computing nodes, where the first intermediate results obtained by the $SC_y$ are first intermediate results obtained according to data blocks in one row in the to-be-processed dataset;

performing, by the computing node $SC_y$, a reduce2 operation on the first intermediate results obtained by the $SC_y$, to obtain a second intermediate result $V''_y$, where the second intermediate result $V''_y$ is a vector including m-dimensional data; and obtaining, by the management node, a processing result for the to-be-processed dataset according to a second intermediate result obtained by the at least one computing node in the second class of computing nodes.

Optionally, in an embodiment, the dataset further includes a data block $V_{2x}$, and the data block $V_{2x}$ is a vector including m-dimensional data. The method 900 further includes:

allocating, by the management node according to the second intermediate result obtained by the at least one computing node that includes the $SC_y$ and that is in the second class of computing nodes, a third processing task to the at least one computing node that includes the $SC_y$ and that is in the second class of computing nodes;

obtaining, by the computing node $SC_y$, the data block $V_{2x}$ in the dataset according to the third processing task; and performing, by the computing node $SC_y$, an assign assign operation on the second intermediate result $V''_y$ and the data block $V_{2x}$ that are obtained by the $SC_y$, to obtain a processing result for the to-be-processed dataset.

Optionally, in an embodiment, m=n, and the data block $V_{1x}$ and the data block $V_{2x}$ are a same data block.

Optionally, in an embodiment, when the second class of computing nodes include at least two computing nodes, the at least two computing nodes in the second class of computing nodes concurrently process second processing tasks allocated by the management node.

Optionally, in an embodiment, the management node, the first class of computing nodes, and the second class of computing nodes each may be a physical machine, a virtual machine, or a central processing unit (CPU).

Therefore, according to the data processing method provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

FIG. 19 shows a data processing method 1000 according to an embodiment of the present disclosure. The method 1000 is applied to a data processing system. The data processing system includes a management node and a first class of computing nodes. The method 1000 includes:

S1001: The management node allocates first processing tasks to at least two computing nodes that include an $FC_x$ and that are in the first class of computing nodes, where the $FC_x$ is the $x^{th}$ computing node in the at least two computing nodes, and x is a positive integer; and the at least two computing nodes in the first class of computing nodes concurrently process the first processing tasks allocated by the management node.

S1002: The computing node $FC_x$ obtains, according to a first processing task allocated by the management node, a data block $M_{1x}$ and a data block $M_{2x}$ that are in a to-be-processed dataset, where the data block $M_{1x}$ is a matrix including m rows and n columns of data, the data block $M_{2x}$ is a matrix including n rows and p columns of data, m, n, and p are positive integers, and a value of n is not less than 2.

S1003: The computing node $FC_x$ performs a combine (for example, combine2) operation and a reduce (for example, reduce2) operation on the data block $M_{1x}$ and the data block $M_{2x}$, to obtain a first intermediate result $M'_x$, where the first intermediate result $M'_x$ is a matrix including m rows and p columns of data; and the first intermediate result $M'_x$ has an element $m'_{i,j}$, where i and j are variants, a value of i ranges from 1 to m, a value of j ranges from 1 to p, $m'_{i,j} = m'_{i,j,n}$, $m'_{i,j,n}$ is obtained according to $m'_{i,j,k} = \text{reduce2}(m'_{i,j,k-1}, \text{combine2}(m_{1[i,k]}, m_{2[k,j]}))$, $m_{1[i,k]}$ is an element in the $i^{th}$ row and the $k^{th}$ column of the data block $M_{1x}$, $m_{2[k,j]}$ is an element in the $k^{th}$ row and the $j^{th}$ column of the data block $M_{2x}$, k is a variant, and a value of k ranges from 1 to n.

S1004: The management node obtains a processing result for the to-be-processed dataset according to first intermediate results obtained by the at least two computing nodes in the first class of computing nodes.

Therefore, according to the data processing method provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

Optionally, in an embodiment, the data processing system further includes a second class of computing nodes. The method 1000 further includes:

allocating, by the management node according to the first intermediate results obtained by the at least two computing nodes in the first class of computing nodes, a second processing task to at least one computing node that includes an $SC_y$ and that is in the second class of computing nodes, where the $SC_y$ is the $y^{th}$ computing node in the at least one computing node, and y is a positive integer;

obtaining, by the computing node $SC_y$ according to the second processing task, the first intermediate results obtained by the at least two computing nodes in the first class of computing nodes, where the first intermediate results obtained by the $SC_y$ are first intermediate results obtained according to data blocks $M_{1x}$ in one row and data blocks $M_{2x}$ in one column that are in the to-be-processed dataset;

performing, by the computing node $SC_y$, a reduce2 operation on the first intermediate results obtained by the $SC_y$, to obtain a second intermediate result $M''_y$, where the second intermediate result $M''_y$ is a matrix including m rows and p columns of data; and obtaining, by the management node, a processing result for the to-be-processed dataset according to a second intermediate result obtained by the at least one computing node in the second class of computing nodes.

Optionally, in an embodiment, the dataset further includes a data block $M_{3x}$, and the data block $M_{3x}$ is a matrix including m rows and p columns of data. The method 1000 further includes:

allocating, by the management node according to the second intermediate result obtained by the at least one computing node that includes the $SC_y$ and that is in the second class of computing nodes, a third processing task to the at least one computing node that includes the $SC_y$ and that is in the second class of computing nodes;

obtaining, by the computing node $SC_y$, the data block $M_{3x}$ in the dataset according to the third processing task; and performing, by the computing node $SC_y$, an assign assign operation on the second intermediate result $M''_y$ and the data block $M_{3x}$ that are obtained by the $SC_y$, to obtain a processing result for the to-be-processed dataset.

Optionally, in an embodiment, n=m, and the data block $M_{2x}$ and the data block $M_{3x}$ are a same data block.

Optionally, in an embodiment, n=p, and the data block $M_{1x}$ and the data block $M_{3x}$ are a same data block.

Optionally, in an embodiment, when the second class of computing nodes include at least two computing nodes, the at least two computing nodes in the second class of computing nodes concurrently process second processing tasks allocated by the management node.

Optionally, in an embodiment, the management node, the first class of computing nodes, and the second class of computing nodes each may be a physical machine, a virtual machine, or a central processing unit (CPU).

Therefore, according to the data processing method provided by this embodiment of the present disclosure, when a combine operation and a reduce operation are being performed on data blocks, there is no need to perform all combine operations before the reduce operation is performed; instead, the combine operation and the reduce operation are performed alternately, so that memory space occupied by computation can be reduced, and a computation time can be reduced.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

A person skilled in the art may clearly understand that, the technologies in the embodiments of the present disclosure may be implemented by software in addition to a necessary general hardware platform. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium may include any non-transitory machine-readable medium capable of storing program code, such as a USB flash drive, a removable hard disk, a magnetic disk, an optical disc, a random-access memory (RAM), a solid state disk (SSD), or a non-volatile memory. The foregoing descriptions are merely specific embodiments of the present disclosure, but are not intended to limit the protection scope of the present disclosure.

What is claimed is:

1. A data processing system, comprising a management node including a processor and a plurality of computing nodes that form a first class of computing nodes, each of the first class of computing nodes including a processor, wherein the processor of the management node is configured to:
allocate a first processing task to each of at least two computing nodes in the first class of computing nodes, wherein a computing node $FC_x$ is the $x^{th}$ computing node in the at least two computing nodes, and x is a positive integer, and wherein the at least two computing nodes in the first class of computing nodes concurrently perform the first processing tasks allocated by the management node;

the processor of the computing node $FC_x$ is configured to:
obtain, according to the first processing task allocated by the management node, a data block $M_x$ and a data block $V_{1x}$ in a to-be-processed dataset, wherein the data block $M_x$ is a matrix comprising m rows and n columns of data, the data block $V_{1x}$ is a vector comprising n-dimensional data, m and n are positive integers, and n is not less than 2; and perform a combine2 operation and a reduce2 operation on the data block $M_x$ and the data block $V_{1x}$, to obtain a first intermediate result $V'_x$, wherein the first intermediate result $V'_x$ is a vector comprising m-dimensional data; and the first intermediate result $V'_x$ has an element $v'_i$, wherein i is a variant, the value of i ranges from 1 to m, $v'_i = v'_{i,n}$, $v'_{i,n}$ is obtained according to $v'_{i,j} = reduce2(v'_{i,j-1}, combine2(m_{i,j}, v_j))$, $m_{i,j}$ is an element in the data block $M_x$, $v_j$ is an element in the data block $V_{1x}$, j is a variant, and the value of j ranges from 1 to n;

and the processor of the management node is further configured to:
obtain a first processing result for the to-be-processed dataset according to first intermediate results obtained by the at least two computing nodes in the first class of computing nodes.

2. The data processing system according to claim 1, wherein the data processing system further comprises at least one computing node that form a second class of computing nodes, each of the second class of computing nodes comprising a processor, and the processor of the management node is further configured to:
allocate, according to the first intermediate results obtained by the at least two computing nodes in the first class of computing nodes, a second processing task to each of the at least one computing node in the second class of computing nodes, wherein a computing node $SC_y$ is the $y^{th}$ computing node in the at least one computing node, and y is a positive integer;

the processor of the computing node $SC_y$ is configured to:
obtain, according to the second processing task allocated by the management node, the first intermediate results, wherein the first intermediate results obtained by the $SC_y$ are first intermediate results obtained according to data blocks in one row in the to-be-processed dataset; and perform a reduce2 operation on the first intermediate results, to obtain a second intermediate result $V''_y$, wherein the second intermediate result $V''_y$ is a vector comprising m-dimensional data;

and the processor of the management node is further configured to:
obtain a second processing result for the to-be-processed dataset according to the second intermediate result obtained by the at least one computing node in the second class of computing nodes.

3. The data processing system according to claim 2, wherein the to-be-processed dataset further comprises a data block $V_{2x}$, and the data block $V_{2x}$ is a vector comprising m-dimensional data; and the processor of the management node is further configured to:
- allocate, according to the second intermediate result obtained by the at least one computing node in the second class of computing nodes, a third processing task to the at least one computing node in the second class of computing nodes, wherein the at least one computing node in the second class of computing nodes comprises the computing node $SC_y$;
- and the processor of the computing node $SC_y$ is further configured to:
  - obtain the data block $V_{2x}$ in the to-be-processed dataset according to the third processing task; and
  - perform an assign operation on the second intermediate result $V''_y$ and the data block $V_{2x}$, to obtain a third processing result for the to-be-processed dataset.

4. The data processing system according to claim 3, wherein m=n, and the data block $V_{1x}$ and the data block $V_{2x}$ are a same data block.

5. The data processing system according to claim 2, wherein when the second class of computing nodes comprises at least two computing nodes, the processors of the at least two computing nodes concurrently perform the second processing tasks allocated by the processor of the management node.

6. The data processing system according to claim 2,
- wherein the management node is a physical computing device, a virtual machine or a central processing unit,
- wherein the first class of computing nodes comprises a plurality of physical computing devices or a plurality of virtual machines formed on a physical computing device, and
- wherein the second class of computing nodes comprises a plurality of physical computing devices or a plurality of virtual machines formed on a physical computing device.

7. A data processing system, comprising a management node including, a processor and a plurality of computing nodes that form a first class of computing nodes, each of the first class of computing nodes including a processor, wherein
the processor of the management node is configured to:
- allocate a first processing task to each of at least two computing nodes in the first class of computing nodes, wherein a computing node $FC_x$ is the $x^{th}$ computing node in the at least two computing nodes, and x is a positive integer, and wherein the at least two computing nodes in the first class of computing nodes concurrently perform the first processing tasks allocated by the management node;

the processor of the computing node $FC_x$ is configured to:
- obtain, according to the first processing task allocated by the management node, a data block $M_{1x}$ and a data block $M_{2x}$ that are in a to-be-processed dataset, wherein the data block $M_{1x}$ is a matrix comprising m rows and n columns of data, the data block $M_{2x}$ is a matrix comprising n rows and p columns of data, wherein m, n, and p are positive integers, and n is not less than 2; and
- perform a combine2 operation and a reduce2 operation on the data block $M_{1x}$ and the data block $M_{2x}$, to obtain a first intermediate result $M'_x$, wherein the first intermediate result $M'_x$ is a matrix comprising m rows and p columns of data; and the first intermediate result $M'_x$ has an element $m'_{i,j}$, wherein i and j are variants, the value of i ranges from 1 to m, the value of j ranges from 1 to p, $m'_{i,j} = m'_{i,j,n}$ is obtained according to $m'_{i,j,k} = reduce2(m'_{i,j,k-1}, combine2(m_{1[i,k]}, m_{2[k,j]}))$, $m_{1[i,k]}$ is an element in the $i^{th}$ row and the $k^{th}$ column of the data block $M_{1x}$, $M_{2[k,j]}$ is an element in the $k^{th}$ row and the $j^{th}$ column of the data block $M_{2x}$, k is a variant, and the value of k ranges from 1 to n;

and the processor of the management node is further configured to:
- obtain a first processing result for the to-be-processed dataset according to first intermediate results obtained by the at least two computing nodes in the first class of computing nodes.

8. The data processing system according to claim 7, wherein the data processing system further comprises at least one computing node that form a second class of computing nodes, each of the second class of computing nodes comprising a processor, and the processor of the management node is further configured to:
- allocate, according to the first intermediate results obtained by the at least two computing nodes in the first class of computing nodes, a second processing task to each of the at least one computing node in the second class of computing nodes, wherein a computing node $SC_y$ is the $y^{th}$ computing node in the at least one computing node, and y is a positive integer;

the processor of the computing node $SC_y$ is configured to:
- obtain, according to the second processing task allocated by the management node, the first intermediate results, wherein the first intermediate results obtained by the $SC_y$ are first intermediate results obtained according to data blocks $M_{1x}$ in one row and data blocks $M_{2x}$ in one column in the to-be-processed dataset; and
- perform a reduce2 operation on the first intermediate results, to obtain a second intermediate result $M''_y$, wherein the second intermediate result $M''_y$ is a matrix comprising m rows and p columns of data;

and the processor of the management node is further configured to:
- obtain a second processing result for the to-be-processed dataset according to the second intermediate result obtained by the at least one computing node in the second class of computing nodes.

9. The data processing system according to claim 8, wherein the to-be-processed dataset further comprises a data block $M_{3x}$, and the data block $M_{3x}$ is a matrix comprising m rows and p columns of data; and the processor of the management node is further configured to:
- allocate, according to the second intermediate result obtained by the at least one computing node in the second class of computing nodes, a third processing task to the at least one computing node in the second class of computing nodes, wherein the at least one computing node in the second class of computing nodes comprises the computing node $SC_y$;
- and the processor of the computing node $SC_y$ is further configured to:
  - obtain the data block $M_{3x}$ in the to-be-processed dataset according to the third processing task; and
  - perform an assign operation on the second intermediate result $M''_y$ and the data block $M_{3x}$, to obtain a third processing result for the to-be-processed dataset.

10. The data processing system according to claim 9, wherein n=m, and the data block $M_{2x}$ and the data block $M_{3x}$ are a same data block.

11. The data processing system according to claim 9, wherein n=p, and the data block $M_{1x}$ and the data block $M_{3x}$ are a same data block.

12. The data processing system according to claim 8, wherein when the second class of computing nodes comprises at least two computing nodes, the processors of the at least two computing nodes concurrently perform the second processing tasks allocated by the processor of the management node.

13. The data processing system according to claim 7, wherein the management node is a physical computing device, a virtual machine or a central processing unit, wherein the first class of computing nodes is a plurality of physical computing devices or a plurality of virtual machines formed on a physical computing device, and wherein the second class of computing nodes is a plurality of physical computing devices or a plurality of virtual machines formed on a physical computing device.

14. A data processing method for use in a data processing system that comprises a management node including a processor and a plurality of computing nodes that form a first class of computing nodes each of the first class of computing nodes including a processor, the method comprising:
    allocating, by the processor of the management node, a first processing task to each of at least two computing nodes in the first class of computing nodes, wherein a computing node $FC_x$ is the $x^{th}$ computing node in the at least two computing nodes, and x is a positive integer, and wherein the at least two computing nodes in the first class of computing nodes concurrently perform the first processing tasks allocated by the management node;
    obtaining, by the processor of the computing node $FC_x$ according to the first processing task allocated by the management node, a data block $M_x$ and a data block $V_{1x}$ in a to-be-processed dataset, wherein the data block $M_x$ is a matrix comprising m rows and n columns of data, the data block $V_{1x}$ is a vector comprising n-dimensional data, m and n are positive integers, and n is not less than 2;
    performing, by the processor of the computing node $FC_x$, a combine2 operation and a reduce2 operation on the data block $M_x$ and the data block $V_{1x}$, to obtain a first intermediate result $V'_x$, wherein the first intermediate result $V'_x$ is a vector comprising m-dimensional data; and the first intermediate result $V'_x$ has an element $v'_i$, wherein i is a variant, the value of i ranges from 1 to m, $v'_i=v'_{i,n}$, $v'_{i,n}$ is obtained according to $v'_{i,j}$=reduce2($v'_{i,j-1}$,combine2($m_{i,j}$,$v_j$)), $m_{i,j}$ is an element in the data block $M_x$, $v_j$ is an element in the data block $V_{1x}$, j is a variant, and the value of j ranges from 1 to n; and
    obtaining, by the processor of the management node, a first processing result for the to-be-processed dataset according to first intermediate results obtained by the at least two computing nodes in the first class of computing nodes.

15. The method according to claim 14, wherein the data processing system further comprises at least one computing node that form a second class of computing nodes, each of the second class of computing nodes comprising a processor, and the method further comprises:
    allocating, by the processor of the management node according to the first intermediate results obtained by the at least two computing nodes in the first class of computing nodes, a second processing task to each of the at least one computing node in the second class of computing nodes, wherein a computing node $SC_y$ is the $y^{th}$ computing node in the at least one computing node, and y is a positive integer;
    obtaining, by the processor of the computing node $SC_y$ according to the second processing task allocated by the management node, the first intermediate results, wherein the first intermediate results obtained by the $SC_y$ are first intermediate results obtained according to data blocks in one row in the to-be-processed dataset;
    performing, by the processor of the computing node $SC_y$, a reduce2 operation on the first intermediate results, to obtain a second intermediate result $V''_y$, wherein the second intermediate result $V''_y$ is a vector comprising m-dimensional data; and
    obtaining, by the processor of the management node, a second processing result for the to-be-processed dataset according to the second intermediate result obtained by the at least one computing node in the second class of computing nodes.

16. The method according to claim 15, wherein the to-be-processed dataset further comprises a data block $V_{2x}$, and the data block $V_{2x}$ is a vector comprising m-dimensional data; and the method further comprises:
    allocating, by the processor of the management node according to the second intermediate result obtained by the at least one computing node in the second class of computing nodes, a third processing task to the at least one computing node in the second class of computing nodes, wherein the at least one computing node in the second class of computing nodes comprises the computing node $SC_y$;
    obtaining, by the processor of the computing node $SC_y$, the data block $V_{2x}$ in the to-be-processed dataset according to the third processing task; and
    performing, by the processor of the computing node $SC_y$, an assign operation on the second intermediate result $V''_y$ and the data block $V_{2x}$, to obtain a third processing result for the to-be-processed dataset.

17. The method according to claim 16, wherein m=n, and the data block $V_{1x}$ and the data block $V_{2x}$ are a same data block.

18. The method according to claim 15, wherein when the second class of computing nodes comprises at least two computing nodes, the processors of the at least two computing nodes concurrently perform the second processing tasks allocated by the processor of the management node.

19. A data processing method for use in a data processing system that comprises a management node including a processor and a plurality of computing nodes that form a first class of computing nodes, each of the first class of computing nodes including a processor, the method comprising:
    allocating, by the processor of the management node, a first processing task to each of at least two computing nodes in the first class of computing nodes, wherein a computing node $FC_x$ is the $x^{th}$ computing node in the at least two computing nodes, and x is a positive integer, and wherein the at least two computing nodes in the first class of computing nodes concurrently perform the first processing tasks allocated by the management node;
    obtaining, by the processor of the computing node $FC_X$ according to the first processing task allocated by the management node, a data block $M_{1x}$ and a data block $M_{2x}$ that are in a to-be-processed dataset, wherein the data block $M_{1x}$ is a matrix comprising m rows and n columns of data, the data block $M_{2x}$ is a matrix comprising n rows and p columns of data, m, n, and p are positive integers, and n is not less than 2;

performing, by the processor of the computing node $FC_x$, a combine2 operation and a reduce2 operation on the data block $M_{1x}$ and the data block $M_{2x}$, to obtain a first intermediate result $M'_x$, wherein the first intermediate result $M'_x$ is a matrix comprising m rows and p columns of data; and the first intermediate result $M'_x$ has an element $m'_{i,j}$, wherein i and j are variants, the value of i ranges from 1 to m, the value of j ranges from 1 to p, $m'_{i,j} = m'_{i,j,n}$, $m'_{i,j,n}$ is obtained according to $m'_{i,j,k} = \text{reduce2}(m'_{i,j,k-1} \text{combine2}(m_{1[i,k]}, m_{2[k,j]}))$, $m_{1[i,k]}$ is an element in the $i^{th}$ row and the $k^{th}$ column of the data block $M_{1x}$, $m_{2[k,j]}$ is an element in the $k^h$ row and the $j^{th}$ column of the data block $M_{2x}$, k is a variant, and the value of k ranges from 1 to n; and obtaining, by the processor of the management node, a first processing result for the to-be-processed dataset according to first intermediate results obtained by the at least two computing nodes in the first class of computing nodes.

20. The method according to claim 19, wherein the data processing system further comprises at least one computing node that form a second class of computing nodes, and the method further comprises:

allocating, by the processor of the management node according to the first intermediate results obtained by the at least two computing nodes in the first class of computing nodes, a second processing task to each of the at least one computing node in the second class of computing nodes, wherein a computing node $SC_y$ is the $y^{th}$ computing node in the at least one computing node, and y is a positive integer;

obtaining, by the processor of the computing node $SC_y$ according to the second processing task allocated by the management node, the first intermediate results, wherein the first intermediate results obtained by the $SC_y$ are first intermediate results obtained according to data blocks $M_{1x}$ in one row and data blocks $M_{2x}$ in one column in the to-be-processed dataset;

performing, by the processor of the computing node $SC_y$, a reduce2 operation on the first intermediate results obtained by the $SC_y$, to obtain a second intermediate result $M''_y$, wherein the second intermediate result $M''_y$ is a matrix comprising m rows and p columns of data; and obtaining, by the processor of the management node, a second processing result for the to-be-processed dataset according to the second intermediate result obtained by the at least one computing node in the second class of computing nodes.

21. The method according to claim 20, wherein the to-be-processed dataset further comprises a data block $M_{3x}$, and the data block $M_{3x}$ is a matrix comprising m rows and p columns of data; and the method further comprises:

allocating, by the processor of the management node according to the second intermediate result obtained by the at least one computing node in the second class of computing nodes, a third processing task to the at least one computing node in the second class of computing nodes, wherein the at least one computing node in the second class of computing nodes comprises the computing node $SC_y$;

obtaining, by the processor of the computing node $SC_y$, the data block $M_{3x}$ in the to-be-processed dataset according to the third processing task; and performing, by the processor of the computing node $SC_y$, an assign operation on the second intermediate result $M''_y$ and the data block $M_{3x}$, to obtain a third processing result for the to-be-processed dataset.

22. The method according to claim 21, wherein n=m, and the data block $M_{2x}$ and the data block $M_{3x}$ are a same data block.

23. The method according to claim 21, wherein n=p, and the data block $M_{1x}$ and the data block $M_{3x}$ are a same data block.

24. The method according to claim 20, wherein when the second class of computing nodes comprises at least two computing nodes, the processors of the at least two computing nodes in the second class of computing nodes concurrently perform the second processing tasks allocated by processor of the management node.

* * * * *